(12) United States Patent
Idapalapati et al.

(10) Patent No.: US 11,900,840 B2
(45) Date of Patent: Feb. 13, 2024

(54) CHROMINANCE OPTIMIZATIONS IN RENDERING PIPELINES

(71) Applicant: QUALCOMM Incorporated, San Diego, CA (US)

(72) Inventors: Olk Idapalapati, Hyderabad (IN); Venkata Naga Poleswara Rao Karuchula, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 17/644,082

(22) Filed: Dec. 13, 2021

(65) Prior Publication Data

US 2023/0186799 A1 Jun. 15, 2023

(51) Int. Cl.
*G09G 3/00* (2006.01)
*G06T 1/20* (2006.01)

(52) U.S. Cl.
CPC ............ *G09G 3/001* (2013.01); *G06T 1/20* (2013.01); *G09G 2330/021* (2013.01); *G09G 2340/06* (2013.01); *G09G 2340/08* (2013.01); *G09G 2350/00* (2013.01); *G09G 2370/022* (2013.01); *G09G 2370/10* (2013.01); *G09G 2370/16* (2013.01)

(58) Field of Classification Search
CPC ................................ G09G 3/001; G06T 1/20
USPC .................. 345/428, 604; 382/163; 348/572
See application file for complete search history.

(56) References Cited

U.S. PATENT DOCUMENTS

| 8,879,834 | B2 | 11/2014 | Burns et al. |
| 11,100,899 | B2 | 8/2021 | Seiler |
| 2009/0262244 | A1* | 10/2009 | Buttimer ............... G09G 5/008 348/572 |
| 2012/0242682 | A1 | 9/2012 | Nanjo |
| 2012/0294364 | A1 | 11/2012 | Lapicque et al. |

(Continued)

FOREIGN PATENT DOCUMENTS

| EP | 2312849 A1 | 4/2011 |
| WO | 9222887 A1 | 12/1992 |
| WO | 2020035066 A1 | 2/2020 |

OTHER PUBLICATIONS

International Search Report and Written Opinion—PCT/US2022/052445—ISA/EPO—dated Mar. 20, 2023.

*Primary Examiner* — Prabodh M Dharia
(74) *Attorney, Agent, or Firm* — QUALCOMM Incorporated

(57) ABSTRACT

Aspects presented herein relate to methods and devices for graphics processing including an apparatus, e.g., client device or a server. The apparatus may receive, from a server, a plurality of data packets corresponding to data for each of a plurality of frames associated with at least one application. The apparatus may also convert the plurality of data packets to content associated with the data for each of the plurality of frames, the content including at least one of monochrome color content or a luminance component. Further, the apparatus may perform a color space conversion on the content associated with the data for each of the plurality of frames, the color space conversion adding at least one chrominance plane to the content. The apparatus may also display, upon performing the color space conversion, the content associated with the data for each of the plurality of frames.

29 Claims, 10 Drawing Sheets

(56) References Cited

U.S. PATENT DOCUMENTS

| | | | |
|---|---|---|---|
| 2014/0376611 A1* | 12/2014 | Kim | H04N 19/85 |
| | | | 375/240.02 |
| 2015/0042659 A1* | 2/2015 | Holland | H04N 19/182 |
| | | | 345/428 |
| 2015/0279315 A1 | 10/2015 | Huang et al. | |
| 2016/0261793 A1* | 9/2016 | Sivan | G06V 40/166 |
| 2017/0252647 A1* | 9/2017 | Perry | A63F 13/335 |
| 2018/0063500 A1* | 3/2018 | Rusanovskyy | H04N 21/6582 |
| 2019/0068969 A1* | 2/2019 | Rusanovskyy | H04N 19/186 |
| 2019/0373241 A1 | 12/2019 | Boyce et al. | |
| 2020/0342577 A1 | 10/2020 | Rodriguez et al. | |

* cited by examiner

CHROMINANCE OPTIMIZATIONS IN RENDERING PIPELINES

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a client device or any apparatus that may perform graphics processing. The apparatus may receive, from a server, a plurality of data packets corresponding to data for each of a plurality of frames associated with at least one application, the data for each of the plurality of frames being monochrome color data or polychrome color data. The apparatus may also convert the plurality of data packets to content associated with the data for each of the plurality of frames, the content including at least one of monochrome color content or a luminance component. Additionally, the apparatus may decrypt the content associated with the data for each of the plurality of frames, where the content is decrypted prior to the color space conversion, the decrypted content including at least one of the monochrome color content or the luminance component. The apparatus may also decode the decrypted content associated with the data for each of the plurality of frames, where the content is decoded prior to the color space conversion, the decoded content including at least one of the monochrome color content or the luminance component. Moreover, the apparatus may perform a color space conversion on the content associated with the data for each of the plurality of frames, the color space conversion adding at least one chrominance plane to the content. The apparatus may also display, upon performing the color space conversion, the content associated with the data for each of the plurality of frames.

In an aspect of the disclosure, a method, a computer-readable medium, and an apparatus are provided. The apparatus may be a server or any apparatus that may perform graphics processing. The apparatus may receive data for each of a plurality of frames associated with at least one application, the data for each of the plurality of frames being monochrome color data or polychrome color data. The apparatus may also render content associated with the data for each of the plurality of frames, the rendered content including at least one of monochrome color content or a luminance component. Also, the apparatus may encode the rendered content associated with the data for each of the plurality of frames, where the rendered content is encoded prior to being converted, the encoded content including at least one of the monochrome color content or the luminance component. The apparatus may also encrypt the encoded content associated with the data for each of the plurality of frames, where the encoded content is encrypted prior to being converted, the encrypted content including at least one of the monochrome color content or the luminance component. Further, the apparatus may convert the rendered content associated with the data for each of the plurality of frames to a plurality of data packets. The apparatus may also transmit, to a client device, the plurality of data packets corresponding to the rendered content associated with the data for each of the plurality of frames.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
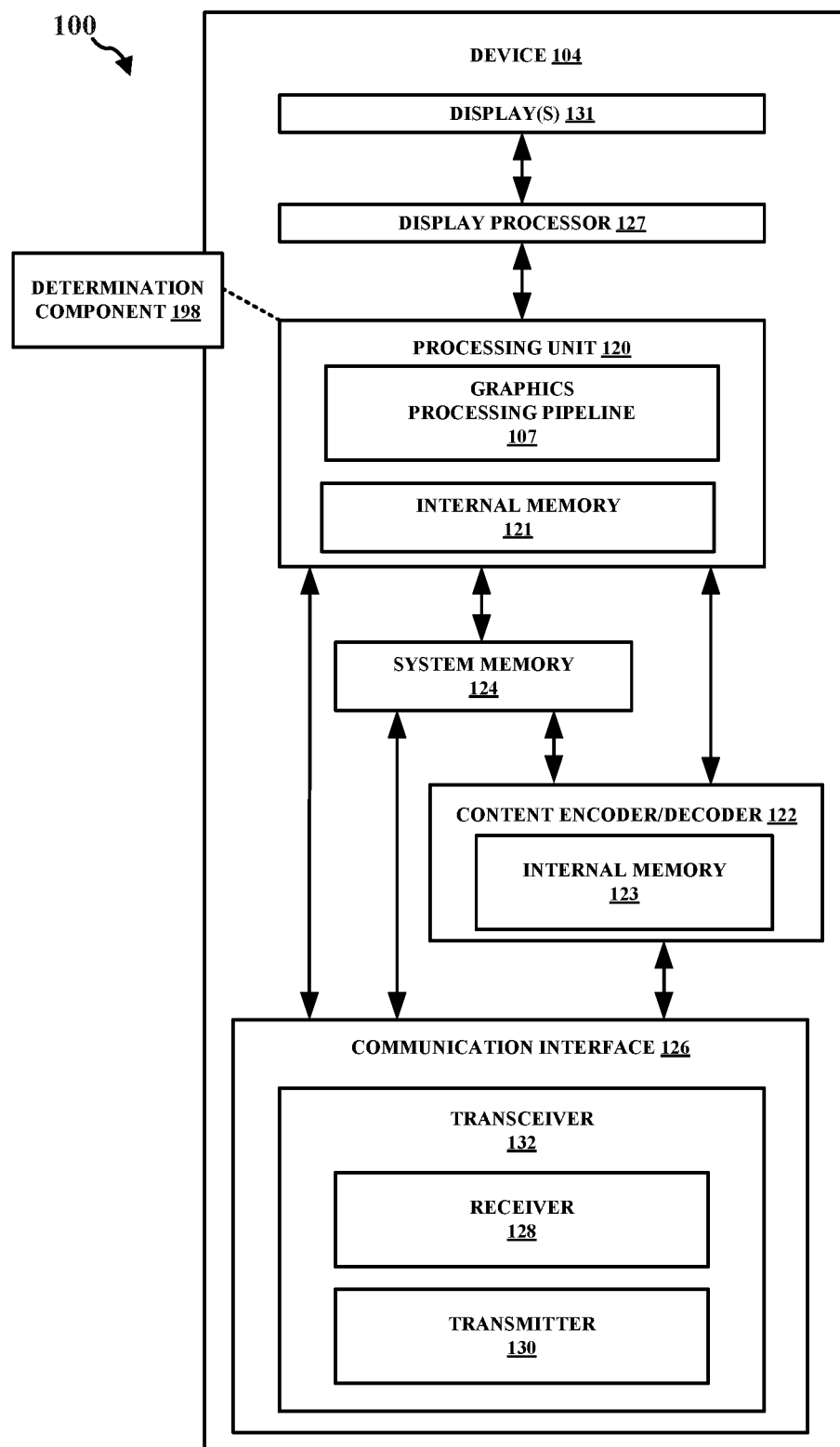
FIG. 1 is a block diagram that illustrates an example content generation system.

Some aspects of graphics processing may be associated with rendering or displaying different types of content, e.g., virtual reality (VR) content, extended reality (XR), or augmented reality (AR) content. The content may be rendered or created on a server, e.g., a computer or phone. To display this content, users may utilize different types of headsets or display glasses, which may be referred to as a client device. In some instances, when a user wants to use XR glasses for a long duration in the absence of a charging facility, it is desirable to save power at the server or client device. Also, when the battery of either the client device or the server is getting low (i.e., beyond a threshold percentage decided by the user), it is desirable to save power at the server or client device. Moreover, if a user would like to extend battery life voluntarily, then it is desirable to save power at the server or client device and provide a long battery life to either device. Some solutions for power saving may be associated with reducing a frame resolution rate or utilizing foveated rendering during the rendering/display process in order to reduce power usage and/or improve performance at the server/client device. Additionally, the rendering pipeline (e.g., at a graphics processing unit (GPU)) may utilize full color or chrominance data. If each step in the rendering pipeline is associated with the processing of full color/chrominance data, this may waste a large amount of power. Indeed, by processing full/polychrome color data or full/polychrome chrominance data at every step in a split rendering process, more power may be utilized than may otherwise be necessary. In turn, this may waste a large amount of power at each of the devices, e.g., the server and the client device. Aspects of the present disclosure may process some steps in a split rendering process or a non-split rendering process without using full color data or polychrome color data. For instance, aspects of the present disclosure may allow for the processing of some steps in a split rendering process or a non-split rendering process using monochrome color data. Additionally, in some instances, aspects of the present disclosure may process some steps in a split rendering process or a non-split rendering process using a luminance component, instead of both a luminance component and a chrominance component. By doing so, aspects of the present disclosure may save a large amount of power at each of the devices in a split rendering process (e.g., the server and the client device) or a non-split rendering process. Accordingly, aspects of the present disclosure may reduce the amount of power utilized during color data processing in a split rendering process or a non-split rendering process.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to receive, from a server, a plurality of data packets corresponding to data for each of a plurality of frames associated with at least one application, the data for each of the plurality of frames being monochrome color data or polychrome color data. The determination component 198 may also be configured to convert the plurality of data packets to content associated with the data for each of the plurality of frames, the content including at least one of monochrome color content or a luminance component. The determination component 198 may also be configured to decrypt the content associated with the data for each of the plurality of frames, where the content is decrypted prior to the color space conversion, the decrypted content including at least one of the monochrome color content or the luminance component. The determination component 198 may also be configured to decode the decrypted content associated with the data for each of the plurality of frames, where the content is decoded prior to the color space conversion, the decoded content including at least one of the monochrome color content or the luminance component. The determination component 198 may also be configured to perform a color space conversion on the content associated with the data for each of the plurality of frames, the color space conversion adding at least one chrominance plane to the content. The determination component 198 may also be configured to display, upon performing the color space conversion, the content associated with the data for each of the plurality of frames.

Referring again to FIG. 1, in certain aspects, the processing unit 120 may include a determination component 198 configured to receive data for each of a plurality of frames associated with at least one application, the data for each of the plurality of frames being monochrome color data or polychrome color data. The determination component 198 may also be configured to render content associated with the data for each of the plurality of frames, the rendered content including at least one of monochrome color content or a luminance component. The determination component 198 may also be configured to encode the rendered content associated with the data for each of the plurality of frames, where the rendered content is encoded prior to being converted, the encoded content including at least one of the monochrome color content or the luminance component. The determination component 198 may also be configured to encrypt the encoded content associated with the data for each of the plurality of frames, where the encoded content is encrypted prior to being converted, the encrypted content including at least one of the monochrome color content or the luminance component. The determination component 198 may also be configured to convert the rendered content associated with the data for each of the plurality of frames to a plurality of data packets. The determination component 198 may also be configured to transmit, to a client device, the plurality of data packets corresponding to the rendered content associated with the data for each of the plurality of frames. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
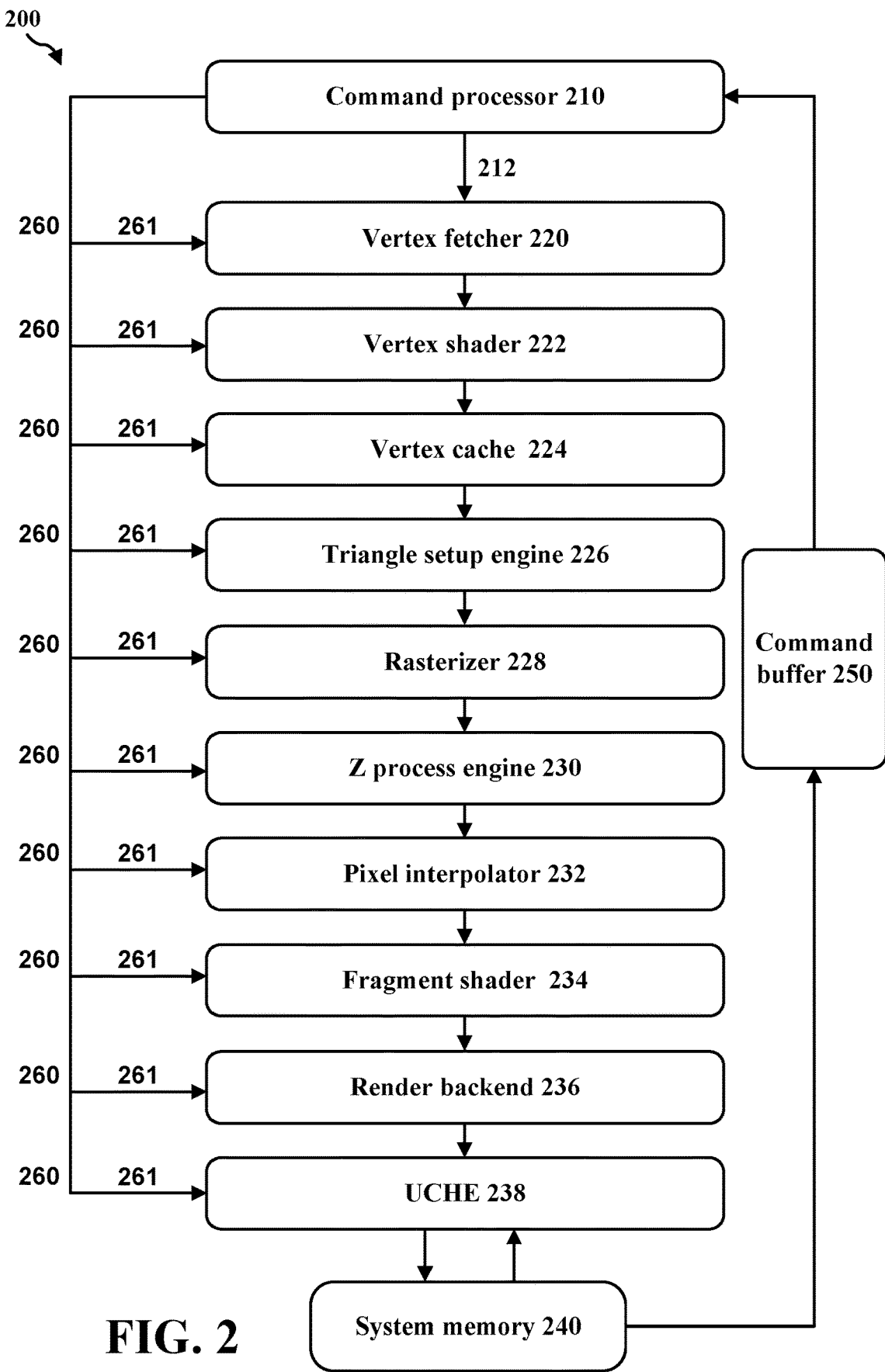
FIG. 2 is an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call data packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Some aspects of graphics processing may utilize color spaces (i.e., a specific organization of colors). A color space may support a reproducible representation of color, such as via an analog or a digital representation. Also, a color space may help to understand the color capabilities of a particular device or digital file. For instance, when trying to reproduce color on a device, color spaces may show details of shadows/highlights or color saturation. There are a number of different types of color spaces or color models (i.e., an abstract mathematical model describing the way colors can be represented as tuples of numbers). For example, there are red (R) green (G) blue (B) (RGB) color spaces/models or luminance (Y) chrominance (UV) (YUV) color spaces/models.

Additionally, color spaces may be converted from one color space to another color space in a process referred to as color space conversion (i.e., the translation of the representation of a color from one basis to another). A color space conversion may occur in the context of converting an image that is represented in one color space to a representation in another color space. For instance, one objective of a color space conversion may be to make a converted image look as similar as possible to an original image. One example of a color space conversion is converting an RGB color space to a YUV color space, or vice versa.

In some aspects, the use of a YUV color space may be convenient for video streams of natural images. For example, it may be straightforward to encode and decode a full image (e.g., a one-to-one pixel ratio) between an RGB color space and a YUV color space. However, in an image processing pipeline that utilizes filtering from the YUV image, the encoding/decoding process may be difficult if the source image is non-linear (i.e., gamma) compressed with certain types of color space (e.g., a standard RGB (sRGB) color space).

Further, filtering may be utilized if a certain image (e.g., a YUV image) is part of an image processing or rendering pipeline that may apply scaling, rotations, or other arbitrary image access. If the source is linear RGB, then filtering may be performed directly from the resulting YUV. If the source is non-linear (i.e., gamma) compressed sRGB, it may not be possible to correctly filter from the resulting YUV as the Y/U/V components are accumulations of non-linear R/G/B components. Instead, each sample may be converted from YUV to sRGB, and then from sRGB to linear RGB before being filtered. Applying these conversions for all samples for an advanced (i.e., bi-cubic) filtering kernel may be expensive. This may be even more complex when dealing with sub sampled chroma.

As indicated above, YUV is a color encoding system based on human perception. For instance, Y=luminance (i.e., linear) or Y'=luma (i.e., non-linear) is the brightness value, to which the human eye is most sensitive. Another color encoding system based on human perception is YCbCr, which is similar to YUV except that the chrominance component is CbCr instead of UV. Chrominance (e.g., consisting of U/Cb (blue projection) and V/Cr (red projection)) is the color values to which the human eye is less sensitive, hence these values can be down-sampled. In some instances, YUV may be associated with analog television systems, while YCbCr may be the digital video equivalent.

As further indicated above, RGB and YUV may be utilized in different processes. For example, RGB may be utilized as a common color encoding system for computer images, while YUV may be typically utilized for a video transfer. The transfer between RGB and YUV may be a relatively straight forward process, such as the conversion of one channel in RGB (e.g., R/G/B) to a corresponding channel in YUV (e.g., Y/U/V). For instance, various industry standards may result in a weighted sum of three components of RGB or YUV (e.g., R/G/B or Y/U/V) plus an offset and/or a scale.

In some aspects, the rendering of content (e.g., color content) may be performed in multiple locations and/or on multiple devices, such as to divide the rendering workload between different devices. For example, the rendering may be split between a server and a client device, which may be referred to as "split rendering." In some instances, split rendering may be a method for bringing content to client devices, where a portion of the graphics processing may be performed outside of the client device, e.g., at a server. In some aspects, the server may be at least one of: a phone, a smart phone, a computer, or a cloud server. Further, the client device may be at least one of: a headset, a head mounted display (HMD), display glasses, or smart glasses.

Split rendering may be performed for a number of different types of applications, e.g., virtual reality (VR) applications, augmented reality (AR) applications, and/or extended reality (XR) applications. In VR applications, the content displayed at the client device may correspond to man-made or animated content. In AR or XR content, a portion of the content displayed at the client device may correspond to real-world content, e.g., objects in the real world, and a portion of the content may be man-made or animated content. Also, the man-made or animated content and real-world content may be displayed in an optical see-through or a video see-through device, such that the user may view real-world objects and man-made or animated content simultaneously. In some aspects, man-made or animated content may be referred to as augmented content, or vice versa.

Split XR or AR systems may also introduce latency when delivering the rendered content to the client display. In some aspects, this latency may be even higher when rendering occurs on a server than compared to client rendering, but it may also enable more complex XR or AR applications. In addition, there may be non-negligible latency between the time a camera pose is computed and the time the content appears on the client display. For instance, a certain amount of latency may be present in split XR or AR systems.

Figure 3:
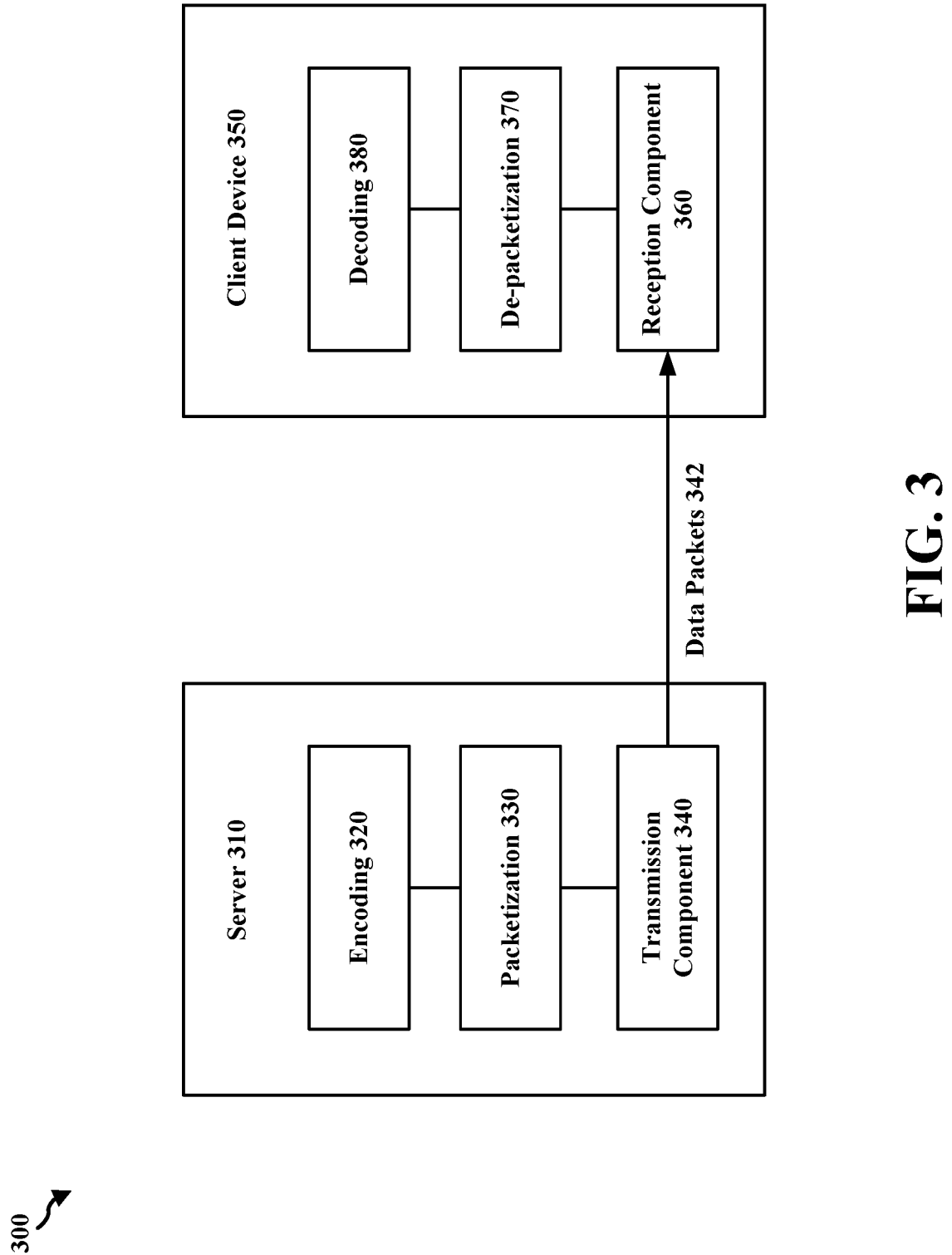
FIG. 3 is a diagram illustrating example communication of content/data in accordance with a split rendering process.

FIG. 3 illustrates diagram 300 including communication of content/data in accordance with a split rendering process. As shown in FIG. 3, diagram 300 includes server 310 and client device 350 that are associated with a split rendering process. FIG. 3 shows a number of processes that are performed at the server 310 including encoding process 320 and packetization process 330, as well as a number of processes that are performed at the client device 350 including de-packetization process 370 and decoding process 380. Server 310 and client device 350 also include a transmission component 340 and a reception component 360, respectively.

As shown in FIG. 3, on the server 310, data/content associated with images/frames may be encoded during encoding process 320. After encoding process 320, the data/content may then undergo a packetization process 330, e.g., a real-time transport protocol (RTP) packetization process. During the packetization process, the data/content may be converted to data packets 342. The data packets 342 may then be transmitted from the transmission component 340 of server 310 to the reception component 360 of client device 350. In some instances, the data packets may be transmitted via a user datagram protocol (UDP) internet protocol (IP) (UDP/IP) network protocol. On the client device 350, the data packets 342 may be received via the reception component 360, e.g., received via a UDP/IP network protocol. The data packets 342 may also undergo a de-packetization process 370, e.g., a real-time transport protocol (RTP) de-packetization process, which may convert the data packets into data/content. After de-packetization, the data/content may be decoded during decoding process 380. Finally, the decoded data/content may be sent to a display or HMD on the client device 350 for display of the data/content.

As indicated above, aspects of graphics processing may be associated with rendering or displaying different types of content, e.g., virtual reality (VR) content, extended reality (XR), or augmented reality (AR) content. The content may be rendered or created on a server, e.g., a computer or phone. To display this content, users may utilize different types of headsets or display glasses, which may be referred to as a client device. In some instances, when a user wants to use XR glasses for a long duration in the absence of a charging facility, it is desirable to save power at the server or client device. Also, when the battery of either the client device or the server is getting low (i.e., beyond a threshold percentage decided by the user), it is desirable to save power at the server or client device. Moreover, if a user would like to extend battery life voluntarily, then it is desirable to save power at the server or client device and provide a long battery life to either device.

Some solutions for power saving may be associated with reducing a frame resolution or frame refresh rate during the rendering/display process. Further, utilizing foveated rendering may reduce power usage and/or improve performance at the server/client device. Additionally, the rendering pipeline (e.g., at a graphics processing unit (GPU)) may utilize full color or chrominance data. If each step in the rendering pipeline is associated with the processing of full color/chrominance data, this may waste a large amount of power.

Figure 4:
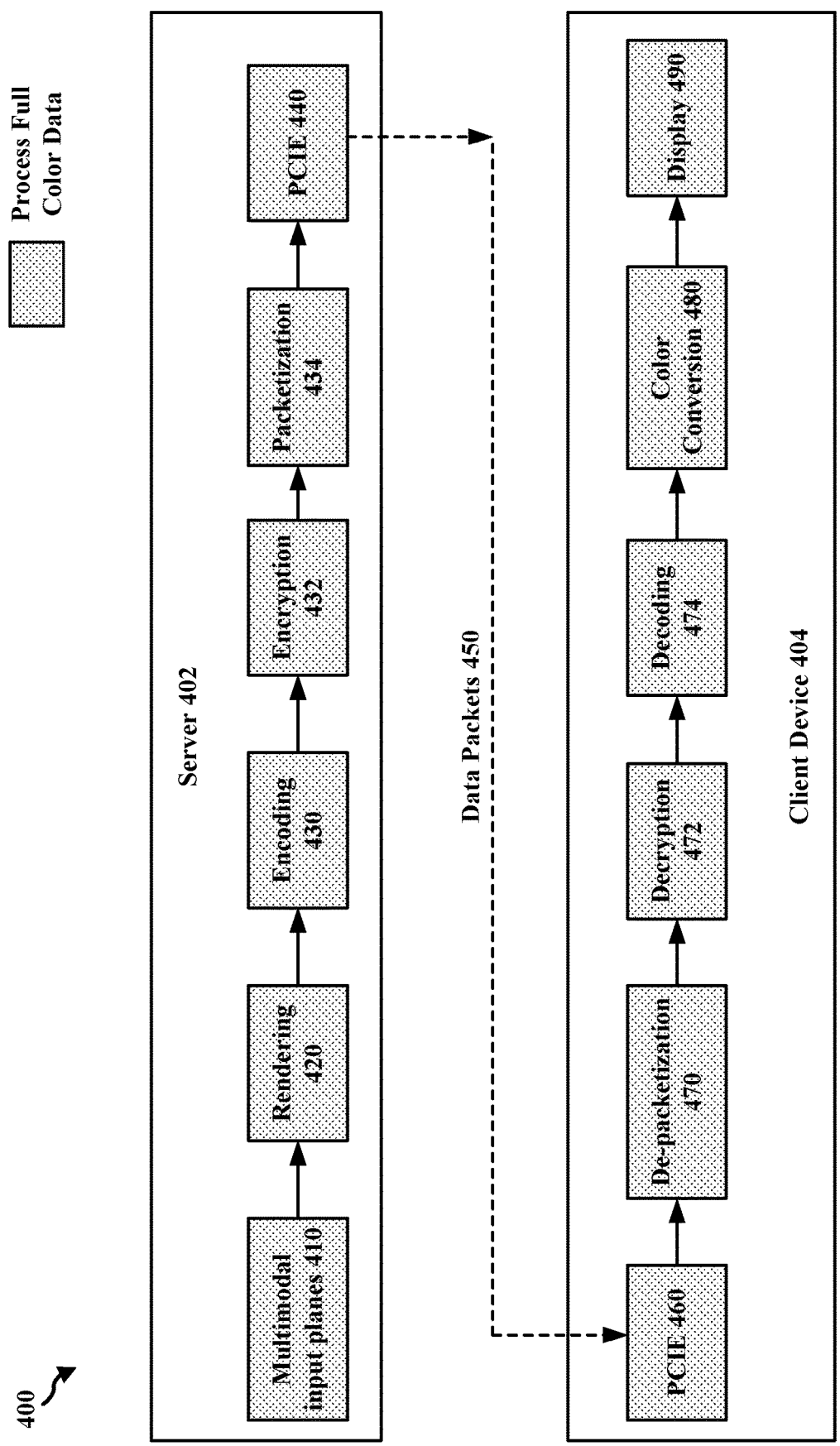
FIG. 4 is a diagram illustrating example processing steps in a split rendering process.

FIG. 4 illustrates a diagram 400 of example processing steps in a split rendering process. More specifically, FIG. 4 shows a diagram 400 of different processing steps at a server 402 (e.g., a smart phone or computer) and a client device 404 (e.g., a headset, HMD, or smart glasses). For instance, server 402 may perform the steps at 410, 420, 430, 432, 434, 440, while client device 404 may perform the steps at 460, 470, 472, 474, 480, 490. On the server 402, data for multiple frames may be received via multimodel input planes 410. For instance, the data may be associated with an application (e.g., a game, a video, etc.). After the data is received, content for the data may be rendered during rendering process 420. Also, the content for the data may be encoded during encoding process 430. The content for the data may also be encrypted during encryption process 432. Further, the content for the data may be packetized into multiple data packets 450 during packetization process 434. Moreover, the data packets 450 may be transmitted to client device 404 via a transmission process (e.g., a peripheral component interconnect express (PCIE) process 440).

On the client device 404, the data packets 450 may be received from the server 402 via a reception process (e.g., a PCIE process 460). The data packets 450 may be de-packetized into content for the data during de-packetization process 470. The content for the data may also be decrypted during decryption process 472. Also, the content for the data may be decoded during decoding process 474. The client device 404 may also perform a color space conversion 480 on the content. Finally, after the color space conversion 480, the content may be displayed on display 490.

As shown in FIG. 4, each of the steps at the server 402 (i.e., the steps at 410, 420, 430, 432, 434, 440) and each of the steps at the client device 404 (i.e., the steps at 460, 470, 472, 474, 480, 490) may be processed using full color data or polychrome color data. By processing full/polychrome color data or full/polychrome chrominance data at every step in a split rendering process or a non-split rendering process, more power may be utilized than may otherwise be necessary. In turn, this may waste a large amount of power at each of the devices, e.g., the server and the client device. For instance, each of the steps at the server 402 and client device 404 may not need to be performed using full color data, so power may be wasted if each step is performed with full color data.

Based on the above, it may be beneficial to process some steps in a split rendering process or a non-split rendering process without using full or polychrome color data. For example, it may be beneficial to process some steps in a split rendering process or a non-split rendering process using monochrome color data. It may also be beneficial to process some steps in a split rendering process or a non-split rendering process using a luminance component, rather than both a luminance component and a chrominance component.

Aspects of the present disclosure may process some steps in a split rendering process or a non-split rendering process without using full color data or polychrome color data. For instance, aspects of the present disclosure may allow for the processing of some steps in a split rendering process or a non-split rendering process using monochrome color data. Additionally, in some instances, aspects of the present disclosure may process some steps in a split rendering process or a non-split rendering process using a luminance component, instead of both a luminance component and a chrominance component. By doing so, aspects of the present disclosure may save a large amount of power at each of the devices in a split rendering process (e.g., the server and the client device) or a non-split rendering process. Accordingly, aspects of the present disclosure may reduce the amount of power utilized during color data processing in a split rendering process or a non-split rendering process.

As indicated herein, for split rendering processes, aspects of the present disclosure may save power at a server/client device by reducing the amount of data that is processed with full color/chrominance components. For instance, aspects of the present disclosure may reduce the amount of full color/chrominance data that is processed in the entire rendering pipeline (e.g., a GPU rendering pipeline) or a portion of the rendering pipeline. In order to do so, aspects of the present disclosure may limit the type of data that is processed to monochrome color data, rather than processing the data as full color/chrominance data.

Figure 5:
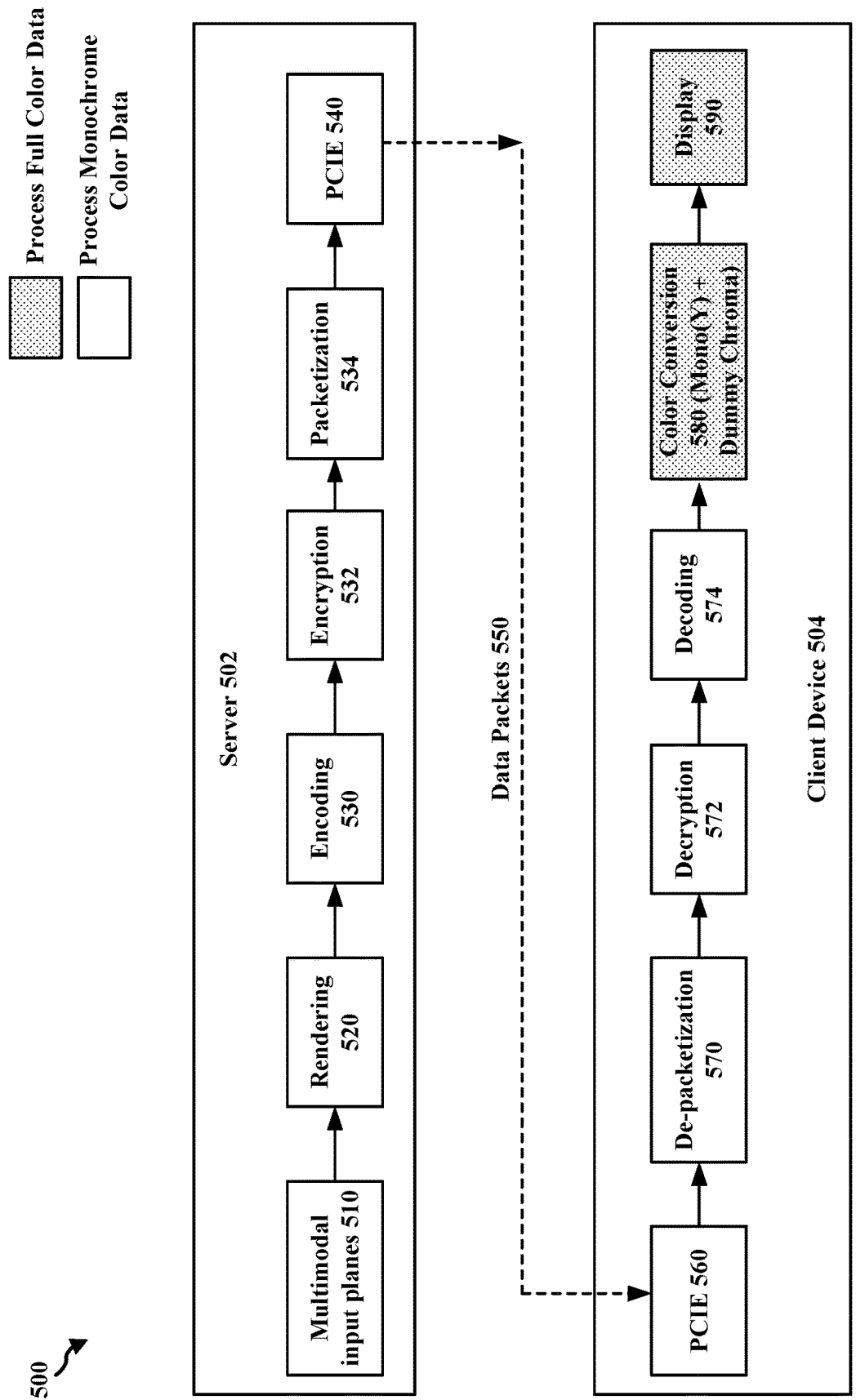
FIG. 5 is a diagram illustrating example processing steps in a split rendering process.

FIG. 5 illustrates a diagram 500 of example processing steps in a split rendering process according to aspects of the present disclosure. More specifically, FIG. 5 shows a diagram 500 of different processing steps at a server 502 (e.g., a smart phone or computer) and a client device 504 (e.g., a headset, HMD, or smart glasses). For instance, server 502 may perform the steps at 510, 520, 530, 532, 534, and 540, while client device 504 may perform the steps at 560, 570, 572, 574, 580, and 590. As shown in FIG. 5, each of the steps at 510, 520, 530, 532, 534, 540, 560, 570, 572, and 574 may be performed using monochrome color data. In some instances, as shown in FIG. 5, the steps at 580 and 590 may be performed using full color data.

As shown in FIG. 5, on the server 502, data for multiple frames may be received via multimodel input planes 510, where this step may be performed using monochrome color data. The data may be associated with an application (e.g., a game, a video, etc.). After the data is received, content for the data may be rendered during rendering process 520, where this step may be performed using monochrome color data. The content may include at least one of monochrome color content or a luminance component. Also, the content for the data may be encoded during encoding process 530, where this step may be performed using monochrome color data. The content for the data may also be encrypted during encryption process 532, where this step may also be performed using monochrome color data. Further, the content for the data may be packetized into multiple data packets 550 during packetization process 534, where this step may be performed using monochrome color data. Moreover, the data packets 550 may be transmitted to client device 504 via a transmission process (e.g., a peripheral component interconnect express (PCIE) process 540).

On the client device 504, the data packets 550 may be received from the server 502 via a reception process (e.g., a PCIE process 560). The data packets 550 may be de-packetized into content for the data during de-packetization process 570, where this step may be performed using monochrome color data. The content may include at least one of monochrome color content or a luminance component. The content for the data may also be decrypted during decryption process 572, where this step may also be performed using monochrome color data. Also, the content for the data may be decoded during decoding process 574, where this step may be performed using monochrome color data. The client device 504 may also perform a color space conversion 580 on the content. Finally, after the color space conversion 580, the content may be displayed on display 590. As shown in FIG. 5, the steps at 580 and 590 may be performed using full color data.

As shown in FIG. 5, each of the steps at the server 502 (i.e., 510, 520, 530, 532, 534, and 540) and some the steps at the client device 504 (i.e., 560, 570, 572, and 574) may be processed using monochrome color data. By processing monochrome color data or monochrome chrominance data at the steps in a split rendering process or a non-split rendering process, aspects presented herein may utilize less power compared to processing full color data. In turn, this may save a large amount of power at each of the devices, e.g., the server 502 and the client device 504. For instance, each of the steps at the server 502 and client device 504 may not need to be performed using full color data, so power may be saved if each step is performed with monochrome color data. During color space conversion 580, aspects of the present disclosure may add a dummy chrominance component in order to display full color content at display 590.

As shown in FIG. 5, aspects of the present disclosure may utilize a number of stages in split rendering. For example, at server 502, aspects presented herein may utilize the following stages: (1) receive data for multiple frames via multi-modal input planes from an application (e.g., games, videos, etc.), as shown at 510; (2) prepare rendering frames in monochrome content (e.g., using solely a Y-plane and/or luminance component), as shown at 520; (3) video encode using solely monochrome content (e.g., using solely a Y-plane and/or luminance component), as shown at 530; (4) encryption of content and/or a video stream (e.g., using high-bandwidth digital content protection (HDCP)), as shown at 532; (5) packetization of content into multiple data packets, as shown at 534; and (6) transmission of the data packets via a PCIE process sent on companion Wi-Fi, as shown at 540. The server may use a wireless connection (e.g., Wi-Fi, Bluetooth, 5G, NFC, Li-Fi, etc.) and/or a wired connection (e.g., USB, LAN, etc.) as a medium. Also, the server may be a mobile server, a puck, a fixed device, a personal computer (PC), a cloud computer, and/or a server sitting on the client device.

Additionally, at client device 504, aspects presented herein may utilize the following stages: (7) reception of data packets via a PCIE received on client device Wi-Fi, as shown at 560; (8) de-packetization of the multiple data packets into content, as shown at 570; (9) decryption of content and/or a video stream, as shown at 572; (10) video decoding using solely monochrome content (e.g., using solely a Y-plane and/or luminance component), as shown at 574; (11) perform a color space conversion from one color format to another color format (e.g., convert from an NV12 format to an RGB format), as shown at 580; and (12) send the content to a display after the color space conversion, as shown at 590. Certain color formats (e.g., NV12 color format) may be a biplanar format with a full sized Y plane followed by a single chroma plane with weaved U and V values. NV12 may also be an intermediate YUV 4:2:0 video format. At 590, client device 504 may send content (e.g., RGB content) to a field sequential display (FSD)/RGB display at the client device 504. Also, each of the stages at 510, 520, 530, 532, 534, 540, 560, 570, 572, and 574 may operate using solely monochrome color data (even if a previous stage is feeding full color data to any given stage as an input).

In FIG. 5, the step at 580 may be a bridge to handle certain displays (e.g., FSD/RGB displays), so this step may perform a color space conversion from one color format to another color format (e.g., NV12 format to RGB format). Aspects of the present disclosure may save power by reducing the load of dealing with full color/chrominance components in the entire rendering pipeline/path, such as by limiting the process to a monochrome workload at 510, 520, 530, 532, 534, 540, 560, 570, 572, and 574. As shown in FIG. 5, the step at 580 may treat monochrome (Y) data as NV12 data by adding dummy chrominance buffers that are filled with a 128 color value (i.e., NV12=monochrome (Y)+dummy chrominance planes). This step may not add any extra processing load or extra latency/power, as it may be a one-time dummy buffer allocation at an initialization stage. This may be followed by an NV12-to-RGB conversion (e.g., an NV12-to-sRGB conversion). In the case of FSD displays, RGB data may be utilized and may have no support for a monochrome channel input. In order to help with the utilization of FSD displays, aspects of the present disclosure may color convert monochrome content (i.e., solely the Y plane) to RGB content for rendering via the step at 580. This may allow for power savings in the rest of the pipeline (e.g., a GPU rendering pipeline).

Aspects of the present disclosure may include a number of benefits or advantages. As indicated above, aspects of the present disclosure may provide power savings due to mitigating or eliminating the amount of full color/chrominance processing. For instance, aspects of the present disclosure may save a large amount of bus bandwidth (BW), processing load, or latencies, which may in turn help to save power at a server or client device. Additionally, aspects of the present disclosure may allow for a lower power utilization at certain components (e.g., clocks) than may otherwise be utilized under full color/chrominance processing. As indicated herein, aspects of the present disclosure may be utilized with certain types of content (e.g., XR, VR, or AR content) in split rendering or non-split rendering. However, aspects of the present disclosure may be applied to other fields in general, e.g., mobile devices, automotive, internet of things (IoT), etc.

Figure 6:
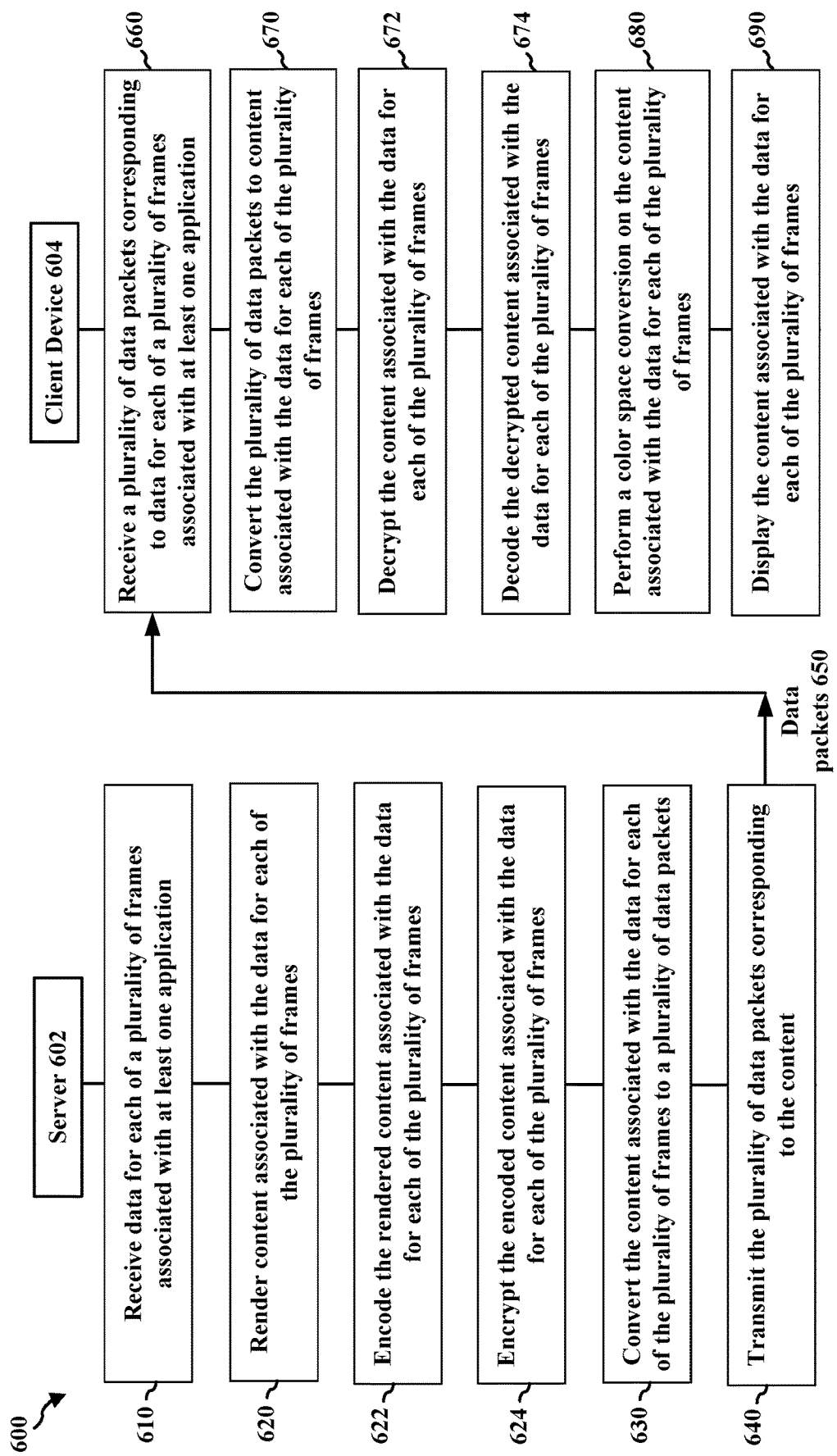
FIG. 6 is a communication flow diagram illustrating example communications between a server and a client device.

FIG. 6 is a communication flow diagram 600 of graphics processing in accordance with one or more techniques of this disclosure. As shown in FIG. 6, diagram 600 includes example communications between a server 602 and a client device 604, in accordance with one or more techniques of this disclosure. The server 602 and the client device 604 may be associated with a split rendering process or a non-split rendering process. Also, each of the server 602 and the client device 604 may include a GPU and/or component associated with graphics processing.

At 610, server 602 may receive data for each of a plurality of frames associated with at least one application, the data for each of the plurality of frames being monochrome color data or polychrome color data. In some instances, the at least one application may be associated with color generation of the plurality of frames, and hardware or software associated with the at least one application may generate luminance color data. The at least one application may be at least one game, at least one video, at least one symbol, at least one icon, or displayed content. Also, the data for each of the plurality of frames may correspond to luminance (Y) chrominance (UV) (YUV) color data, red (R) green (G) blue (B) (RGB) color data, or luminance (Y) chrominance (CrCb) (YCrCb) color data.

In some aspects, the data for each of the plurality of frames may be associated with a plurality of input channels or a plurality of input planes, and the plurality of input planes may include a luminance plane (Y) and one or more chrominance planes (UV). Also, the polychrome color data for each of the plurality of frames may include full color data or partial color data, and the polychrome color data may not be generated or decoded by the at least one application once the data for each of the plurality of frames is received. The transmission of the plurality of data packets may correspond to at least one of: a wireless transmission, a wired transmission, or a peripheral component interconnect express (PCIE) process. The server may be at least one of: a phone, a smart phone, a computer, or a cloud server, and the client device may be at least one of: a headset, a head mounted display (HMD), display glasses, or smart glasses.

At 620, server 602 may render content associated with the data for each of the plurality of frames, the rendered content including at least one of monochrome color content or a luminance component. The monochrome color content or the luminance component may correspond to a luminance plane, such that the rendered content associated with the data for each of the plurality of frames may correspond to the luminance plane. The rendered content associated with the data for each of the plurality of frames may include the luminance component, and the rendered content may not include a chrominance component. Also, the rendered content associated with the data for each of the plurality of frames may include the monochrome color content, and the rendered content may not include color content other than the monochrome color content.

At 622, server 602 may encode the rendered content associated with the data for each of the plurality of frames, where the rendered content is encoded prior to being converted, the encoded content including at least one of the monochrome color content or the luminance component.

At 624, server 602 may encrypt the encoded content associated with the data for each of the plurality of frames, where the encoded content is encrypted prior to being converted, the encrypted content including at least one of the monochrome color content or the luminance component.

At 630, server 602 may convert the rendered content associated with the data for each of the plurality of frames to a plurality of data packets. In some instances, converting the rendered content to the plurality of data packets may include: packetizing the rendered content into the plurality of data packets.

At 640, server 602 may transmit, to client device 604, the plurality of data packets (e.g., data packets 650) corresponding to the rendered content associated with the data for each of the plurality of frames.

At 660, client device 604 may receive, from server 602, a plurality of data packets (e.g., data packets 650) corresponding to data for each of a plurality of frames associated with at least one application, the data for each of the plurality of frames being monochrome color data or polychrome color data. In some instances, the at least one application may be associated with color generation of the plurality of frames, and hardware or software associated with the at least one application may generate luminance color data. The at least one application may be at least one game, at least one video, at least one symbol, at least one icon, or displayed content. Also, the data for each of the plurality of frames may correspond to luminance (Y) chrominance (UV) (YUV) color data, red (R) green (G) blue (B) (RGB) color data, or luminance (Y) chrominance (CrCb) (YCrCb) color data.

In some aspects, the data for each of the plurality of frames may be associated with a plurality of input channels or a plurality of input planes, and the plurality of input planes may include a luminance plane (Y) and one or more chrominance planes (UV). Also, the polychrome color data for each of the plurality of frames may include full color data or partial color data. The reception of the plurality of data packets may correspond to at least one of: a wireless transmission, a wired transmission, or a peripheral component interconnect express (PCIE) process. The server may be at least one of: a phone, a smart phone, a computer, or a cloud server, and the client device may be at least one of: a headset, a head mounted display (HMD), display glasses, or smart glasses.

At 670, client device 604 may convert the plurality of data packets to content associated with the data for each of the plurality of frames, the content including at least one of monochrome color content or a luminance component. In some aspects, converting the plurality of data packets to the content may include: de-packetizing the plurality of data packets into the content.

At 672, client device 604 may decrypt the content associated with the data for each of the plurality of frames, where the content is decrypted prior to the color space conversion, the decrypted content including at least one of the monochrome color content or the luminance component.

At 674, client device 604 may decode the decrypted content associated with the data for each of the plurality of frames, where the content is decoded prior to the color space conversion, the decoded content including at least one of the monochrome color content or the luminance component.

At 680, client device 604 may perform a color space conversion on the content associated with the data for each of the plurality of frames, the color space conversion adding at least one chrominance plane to the content. The at least one chrominance plane may be at least one dummy chrominance plane, at least one placeholder chrominance plane, at least one stand-in chrominance plane, at least one artificial chrominance plane, or at least one fake chrominance plane. The at least one chrominance plane may be prepared at an initialization time period, and the at least one chrominance plane may be associated with static color-filled data. Additionally, the at least one chrominance plane may be prepared using one or more artificial colors based on luminance content or a user configuration via machine learning (ML), deep learning, a hardware mechanism, at least one neural network (NN), or at least one open criteria. The color space conversion may be a luminance (Y) chrominance (UV) (YUV) color conversion, a red (R) green (G) blue (B) (RGB) color conversion, or a luminance (Y) chrominance (CrCb) (YCrCb) color conversion.

In some aspects, prior to the color space conversion, the content associated with the data for each of the plurality of frames may include the luminance component, such that the content may not include a chrominance component prior to the color space conversion. Also, in some aspects, prior to the color space conversion, the content associated with the data for each of the plurality of frames may include the monochrome color content, such that the content may not include color content other than the monochrome color content prior to the color space conversion. The monochrome color content or the luminance component may correspond to a luminance plane, such that after the color space conversion the content associated with the data for each of the plurality of frames may include the luminance plane and the at least one chrominance plane.

At 690, client device 604 may display, upon performing the color space conversion, the content associated with the data for each of the plurality of frames.

Figure 7:
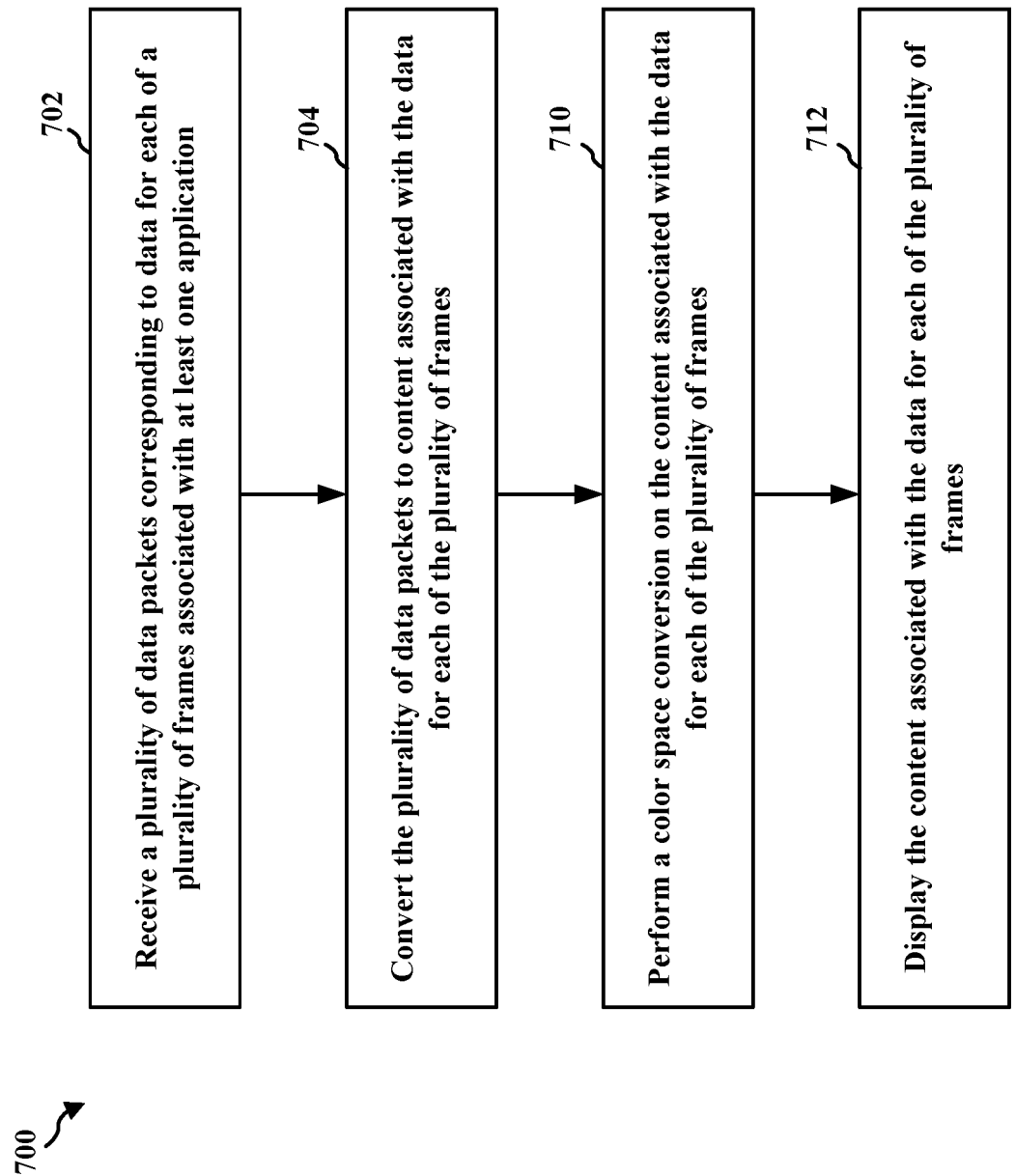
FIG. 7 is a flowchart of an example method of graphics processing.

FIG. 7 is a flowchart 700 of an example method of graphics processing in accordance with one or more techniques of this disclosure. The method may be performed by a client device, which may be associated with an apparatus for graphics processing, a graphics processor, a wireless communication device, and/or any apparatus that may perform graphics processing as used in connection with the examples of FIGS. 1-6. The methods described herein may provide a number of benefits, such as improving resource utilization and/or power savings.

At 702, the client device may receive, from a server, a plurality of data packets corresponding to data for each of a plurality of frames associated with at least one application, the data for each of the plurality of frames being monochrome color data or polychrome color data, as described in connection with the examples in FIGS. 1-6. For example, as described in 660 of FIG. 6, client device 604 may receive, from a server, a plurality of data packets corresponding to data for each of a plurality of frames associated with at least one application, the data for each of the plurality of frames being monochrome color data or polychrome color data. Further, step 702 may be performed by processing unit 120 in FIG. 1. In some instances, the at least one application may be associated with color generation of the plurality of frames, and hardware or software associated with the at least one application may generate luminance color data. The at least one application may be at least one game, at least one video, at least one symbol, at least one icon, or displayed content. Also, the data for each of the plurality of frames may correspond to luminance (Y) chrominance (UV) (YUV) color data, red (R) green (G) blue (B) (RGB) color data, or luminance (Y) chrominance (CrCb) (YCrCb) color data.

In some aspects, the data for each of the plurality of frames may be associated with a plurality of input channels or a plurality of input planes, and the plurality of input planes may include a luminance plane (Y) and one or more chrominance planes (UV). Also, the polychrome color data for each of the plurality of frames may include full color data or partial color data. The reception of the plurality of data packets may correspond to at least one of: a wireless transmission, a wired transmission, or a peripheral component interconnect express (PCIE) process. The server may be at least one of: a phone, a smart phone, a computer, or a cloud server, and the client device may be at least one of: a headset, a head mounted display (HMD), display glasses, or smart glasses.

At 704, the client device may convert the plurality of data packets to content associated with the data for each of the plurality of frames, the content including at least one of monochrome color content or a luminance component, as described in connection with the examples in FIGS. 1-6. For example, as described in 670 of FIG. 6, client device 604 may convert the plurality of data packets to content associated with the data for each of the plurality of frames, the content including at least one of monochrome color content or a luminance component. Further, step 704 may be performed by processing unit 120 in FIG. 1. In some aspects, converting the plurality of data packets to the content may include: de-packetizing the plurality of data packets into the content.

At 710, the client device may perform a color space conversion on the content associated with the data for each of the plurality of frames, the color space conversion adding at least one chrominance plane to the content, as described in connection with the examples in FIGS. 1-6. For example, as described in 680 of FIG. 6, client device 604 may perform a color space conversion on the content associated with the data for each of the plurality of frames, the color space conversion adding at least one chrominance plane to the content. Further, step 710 may be performed by processing unit 120 in FIG. 1. The at least one chrominance plane may be at least one dummy chrominance plane, at least one placeholder chrominance plane, at least one stand-in chrominance plane, at least one artificial chrominance plane, or at least one fake chrominance plane. The at least one chrominance plane may be prepared at an initialization time period, and the at least one chrominance plane may be associated with static color-filled data. Additionally, the at least one chrominance plane may be prepared using one or more artificial colors based on luminance content or a user configuration via machine learning (ML), deep learning, a hardware mechanism, at least one neural network (NN), or at least one open criteria. The color space conversion may be a luminance (Y) chrominance (UV) (YUV) color conversion, a red (R) green (G) blue (B) (RGB) color conversion, or a luminance (Y) chrominance (CrCb) (YCrCb) color conversion.

In some aspects, prior to the color space conversion, the content associated with the data for each of the plurality of frames may include the luminance component, such that the content may not include a chrominance component prior to the color space conversion. Also, in some aspects, prior to the color space conversion, the content associated with the data for each of the plurality of frames may include the monochrome color content, such that the content may not include color content other than the monochrome color content prior to the color space conversion. The monochrome color content or the luminance component may correspond to a luminance plane, such that after the color space conversion the content associated with the data for each of the plurality of frames may include the luminance plane and the at least one chrominance plane.

At 712, the client device may display, upon performing the color space conversion, the content associated with the data for each of the plurality of frames, as described in connection with the examples in FIGS. 1-6. For example, as described in 690 of FIG. 6, client device 604 may display, upon performing the color space conversion, the content associated with the data for each of the plurality of frames. Further, step 712 may be performed by processing unit 120 in FIG. 1.

Figure 8:
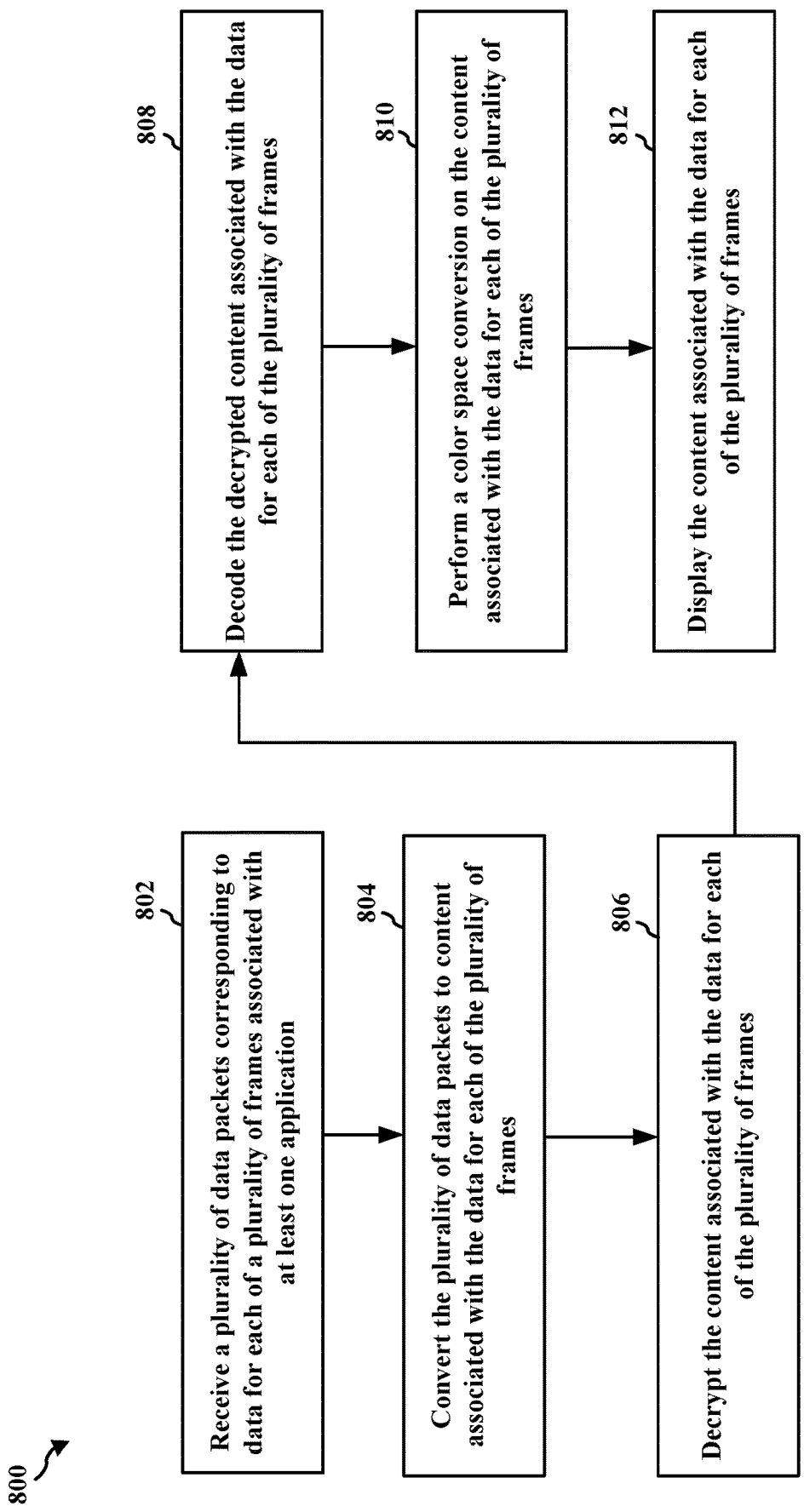
FIG. 8 is a flowchart of an example method of graphics processing.

FIG. 8 is a flowchart 800 of an example method of graphics processing in accordance with one or more techniques of this disclosure. The method may be performed by a client device, which may be associated with an apparatus for graphics processing, a graphics processor, a wireless communication device, and/or any apparatus that may perform graphics processing as used in connection with the examples of FIGS. 1-6. The methods described herein may provide a number of benefits, such as improving resource utilization and/or power savings.

At 802, the client device may receive, from a server, a plurality of data packets corresponding to data for each of a plurality of frames associated with at least one application, the data for each of the plurality of frames being monochrome color data or polychrome color data, as described in connection with the examples in FIGS. 1-6. For example, as described in 660 of FIG. 6, client device 604 may receive, from a server, a plurality of data packets corresponding to data for each of a plurality of frames associated with at least one application, the data for each of the plurality of frames being monochrome color data or polychrome color data. Further, step 802 may be performed by processing unit 120 in FIG. 1. In some instances, the at least one application may be associated with color generation of the plurality of frames, and hardware or software associated with the at least one application may generate luminance color data. The at least one application may be at least one game, at least one video, at least one symbol, at least one icon, or displayed content. Also, the data for each of the plurality of frames may correspond to luminance (Y) chrominance (UV) (YUV) color data, red (R) green (G) blue (B) (RGB) color data, or luminance (Y) chrominance (CrCb) (YCrCb) color data.

In some aspects, the data for each of the plurality of frames may be associated with a plurality of input channels or a plurality of input planes, and the plurality of input planes may include a luminance plane (Y) and one or more chrominance planes (UV). Also, the polychrome color data for each of the plurality of frames may include full color data or partial color data. The reception of the plurality of data packets may correspond to at least one of: a wireless transmission, a wired transmission, or a peripheral component interconnect express (PCIE) process. The server may be at least one of: a phone, a smart phone, a computer, or a cloud server, and the client device may be at least one of: a headset, a head mounted display (HMD), display glasses, or smart glasses.

At 804, the client device may convert the plurality of data packets to content associated with the data for each of the plurality of frames, the content including at least one of monochrome color content or a luminance component, as described in connection with the examples in FIGS. 1-6. For example, as described in 670 of FIG. 6, client device 604 may convert the plurality of data packets to content associated with the data for each of the plurality of frames, the content including at least one of monochrome color content or a luminance component. Further, step 804 may be performed by processing unit 120 in FIG. 1. In some aspects, converting the plurality of data packets to the content may include: de-packetizing the plurality of data packets into the content.

At 806, the client device may decrypt the content associated with the data for each of the plurality of frames, where the content is decrypted prior to the color space conversion, the decrypted content including at least one of the monochrome color content or the luminance component, as described in connection with the examples in FIGS. 1-6. For example, as described in 672 of FIG. 6, client device 604 may decrypt the content associated with the data for each of the plurality of frames, where the content is decrypted prior to the color space conversion, the decrypted content including at least one of the monochrome color content or the luminance component. Further, step 806 may be performed by processing unit 120 in FIG. 1.

At 808, the client device may decode the decrypted content associated with the data for each of the plurality of frames, where the content is decoded prior to the color space conversion, the decoded content including at least one of the monochrome color content or the luminance component, as described in connection with the examples in FIGS. 1-6. For example, as described in 674 of FIG. 6, client device 604 may decode the decrypted content associated with the data for each of the plurality of frames, where the content is decoded prior to the color space conversion, the decoded content including at least one of the monochrome color content or the luminance component. Further, step 808 may be performed by processing unit 120 in FIG. 1.

At 810, the client device may perform a color space conversion on the content associated with the data for each of the plurality of frames, the color space conversion adding at least one chrominance plane to the content, as described in connection with the examples in FIGS. 1-6. For example, as described in 680 of FIG. 6, client device 604 may perform a color space conversion on the content associated with the data for each of the plurality of frames, the color space conversion adding at least one chrominance plane to the content. Further, step 810 may be performed by processing unit 120 in FIG. 1. The at least one chrominance plane may be at least one dummy chrominance plane, at least one placeholder chrominance plane, at least one stand-in chrominance plane, at least one artificial chrominance plane, or at least one fake chrominance plane. The at least one chrominance plane may be prepared at an initialization time period, and the at least one chrominance plane may be associated with static color-filled data. Additionally, the at least one chrominance plane may be prepared using one or more artificial colors based on luminance content or a user configuration via machine learning (ML), deep learning, a hardware mechanism, at least one neural network (NN), or at least one open criteria. The color space conversion may be a luminance (Y) chrominance (UV) (YUV) color conversion, a red (R) green (G) blue (B) (RGB) color conversion, or a luminance (Y) chrominance (CrCb) (YCrCb) color conversion.

In some aspects, prior to the color space conversion, the content associated with the data for each of the plurality of frames may include the luminance component, such that the content may not include a chrominance component prior to the color space conversion. Also, in some aspects, prior to the color space conversion, the content associated with the data for each of the plurality of frames may include the monochrome color content, such that the content may not include color content other than the monochrome color content prior to the color space conversion. The monochrome color content or the luminance component may correspond to a luminance plane, such that after the color space conversion the content associated with the data for each of the plurality of frames may include the luminance plane and the at least one chrominance plane.

At 812, the client device may display, upon performing the color space conversion, the content associated with the data for each of the plurality of frames, as described in connection with the examples in FIGS. 1-6. For example, as described in 690 of FIG. 6, client device 604 may display, upon performing the color space conversion, the content associated with the data for each of the plurality of frames. Further, step 812 may be performed by processing unit 120 in FIG. 1.

Figure 9:
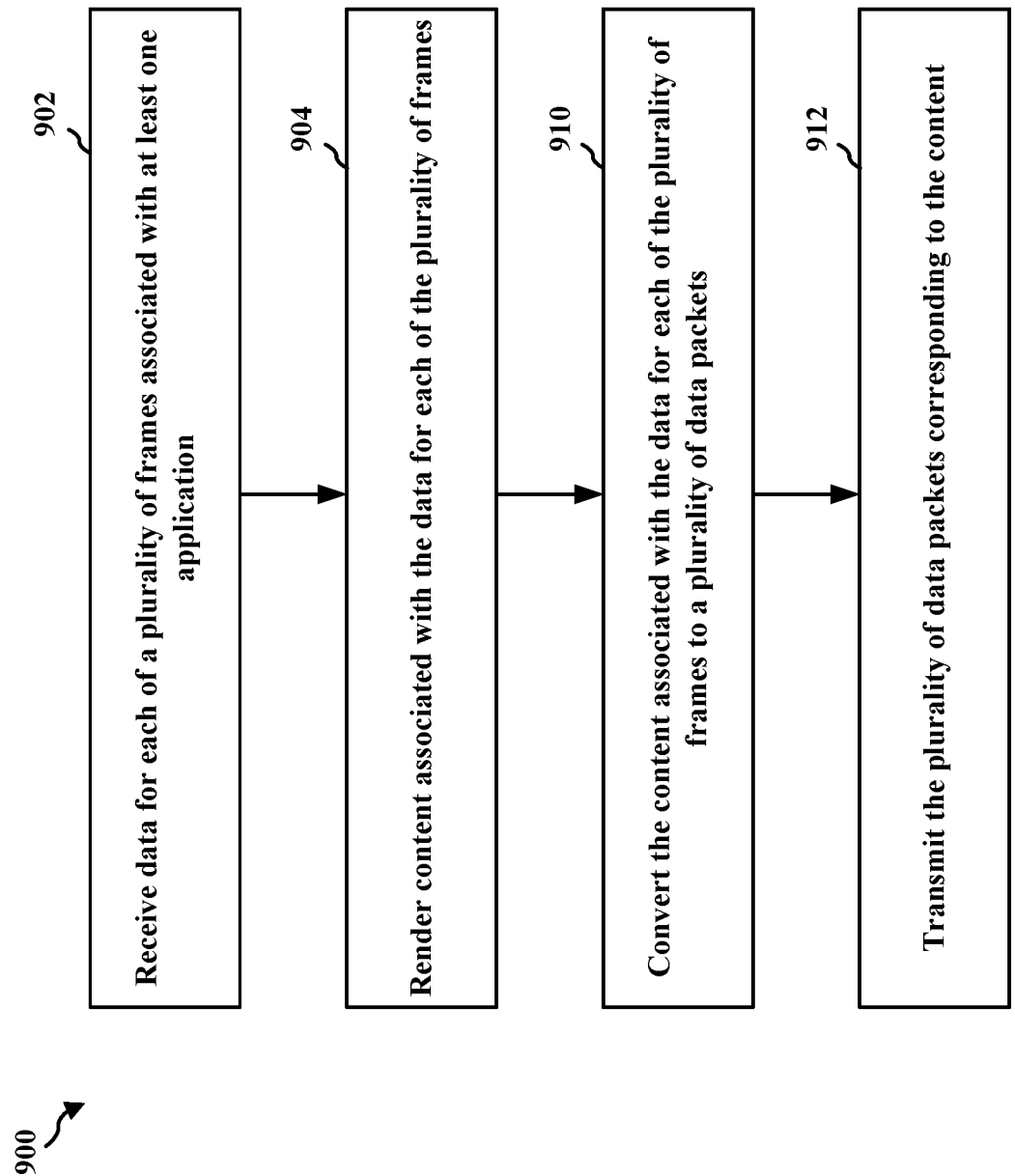
FIG. 9 is a flowchart of an example method of graphics processing.

FIG. 9 is a flowchart 900 of an example method of graphics processing in accordance with one or more techniques of this disclosure. The method may be performed by a server, which may be associated with an apparatus for graphics processing, a graphics processor, a wireless communication device, and/or any apparatus that may perform graphics processing as used in connection with the examples of FIGS. 1-6. The methods described herein may provide a number of benefits, such as improving resource utilization and/or power savings.

At 902, the server may receive data for each of a plurality of frames associated with at least one application, the data for each of the plurality of frames being monochrome color data or polychrome color data, as described in connection with the examples in FIGS. 1-6. For example, as described in 610 of FIG. 6, server 602 may receive data for each of a plurality of frames associated with at least one application, the data for each of the plurality of frames being monochrome color data or polychrome color data. Further, step 902 may be performed by processing unit 120 in FIG. 1. In some instances, the at least one application may be associated with color generation of the plurality of frames, and hardware or software associated with the at least one application may generate luminance color data. The at least one application may be at least one game, at least one video, at least one symbol, at least one icon, or displayed content. Also, the data for each of the plurality of frames may correspond to luminance (Y) chrominance (UV) (YUV) color data, red (R) green (G) blue (B) (RGB) color data, or luminance (Y) chrominance (CrCb) (YCrCb) color data.

In some aspects, the data for each of the plurality of frames may be associated with a plurality of input channels or a plurality of input planes, and the plurality of input planes may include a luminance plane (Y) and one or more chrominance planes (UV). Also, the polychrome color data for each of the plurality of frames may include full color data or partial color data, and the polychrome color data may not be generated or decoded by the at least one application once the data for each of the plurality of frames is received. The transmission of the plurality of data packets may correspond to at least one of: a wireless transmission, a wired transmission, or a peripheral component interconnect express (PCIE) process. The server may be at least one of: a phone, a smart phone, a computer, or a cloud server, and the client device may be at least one of: a headset, a head mounted display (HMD), display glasses, or smart glasses.

At 904, the server may render content associated with the data for each of the plurality of frames, the rendered content including at least one of monochrome color content or a luminance component, as described in connection with the examples in FIGS. 1-6. For example, as described in 620 of FIG. 6, server 602 may render content associated with the data for each of the plurality of frames, the rendered content including at least one of monochrome color content or a luminance component. Further, step 904 may be performed by processing unit 120 in FIG. 1. The monochrome color content or the luminance component may correspond to a luminance plane, such that the rendered content associated with the data for each of the plurality of frames may correspond to the luminance plane. The rendered content associated with the data for each of the plurality of frames may include the luminance component, and the rendered content may not include a chrominance component. Also, the rendered content associated with the data for each of the plurality of frames may include the monochrome color content, and the rendered content may not include color content other than the monochrome color content.

At 910, the server may convert the rendered content associated with the data for each of the plurality of frames to a plurality of data packets, as described in connection with the examples in FIGS. 1-6. For example, as described in 630 of FIG. 6, server 602 may convert the rendered content associated with the data for each of the plurality of frames to a plurality of data packets. Further, step 910 may be performed by processing unit 120 in FIG. 1. In some instances, converting the rendered content to the plurality of data packets may include: packetizing the rendered content into the plurality of data packets.

At 912, the server may transmit, to a client device, the plurality of data packets corresponding to the rendered content associated with the data for each of the plurality of frames, as described in connection with the examples in FIGS. 1-6. For example, as described in 640 of FIG. 6, server 602 may transmit, to a client device, the plurality of data packets corresponding to the rendered content associated with the data for each of the plurality of frames. Further, step 912 may be performed by processing unit 120 in FIG. 1.

Figure 10:
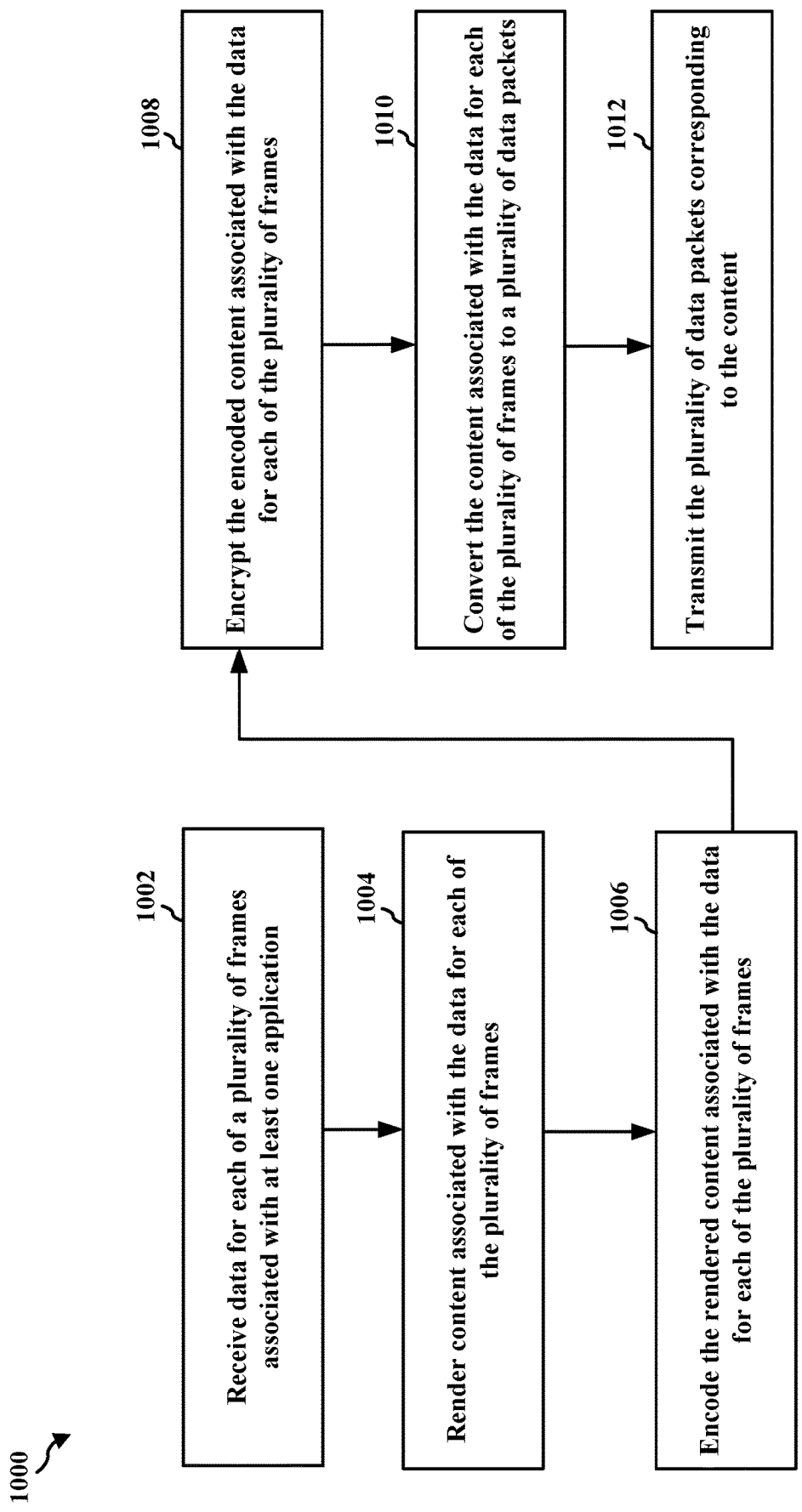
FIG. 10 is a flowchart of an example method of graphics processing.

FIG. 10 is a flowchart 1000 of an example method of graphics processing in accordance with one or more techniques of this disclosure. The method may be performed by a server, which may be associated with an apparatus for graphics processing, a graphics processor, a wireless communication device, and/or any apparatus that may perform graphics processing as used in connection with the examples of FIGS. 1-6. The methods described herein may provide a number of benefits, such as improving resource utilization and/or power savings.

At 1002, the server may receive data for each of a plurality of frames associated with at least one application, the data for each of the plurality of frames being monochrome color data or polychrome color data, as described in connection with the examples in FIGS. 1-6. For example, as described in 610 of FIG. 6, server 602 may receive data for each of a plurality of frames associated with at least one application, the data for each of the plurality of frames being monochrome color data or polychrome color data. Further, step 1002 may be performed by processing unit 120 in FIG. 1. In some instances, the at least one application may be associated with color generation of the plurality of frames, and hardware or software associated with the at least one application may generate luminance color data. The at least one application may be at least one game, at least one video, at least one symbol, at least one icon, or displayed content. Also, the data for each of the plurality of frames may correspond to luminance (Y) chrominance (UV) (YUV) color data, red (R) green (G) blue (B) (RGB) color data, or luminance (Y) chrominance (CrCb) (YCrCb) color data.

In some aspects, the data for each of the plurality of frames may be associated with a plurality of input channels or a plurality of input planes, and the plurality of input planes may include a luminance plane (Y) and one or more chrominance planes (UV). Also, the polychrome color data for each of the plurality of frames may include full color data or partial color data, and the polychrome color data may not be generated or decoded by the at least one application once the data for each of the plurality of frames is received. The transmission of the plurality of data packets may correspond to at least one of: a wireless transmission, a wired transmission, or a peripheral component interconnect express (PCIE) process. The server may be at least one of: a phone, a smart phone, a computer, or a cloud server, and the client device may be at least one of: a headset, a head mounted display (HMD), display glasses, or smart glasses.

At 1004, the server may render content associated with the data for each of the plurality of frames, the rendered content including at least one of monochrome color content or a luminance component, as described in connection with the examples in FIGS. 1-6. For example, as described in 620 of FIG. 6, server 602 may render content associated with the data for each of the plurality of frames, the rendered content including at least one of monochrome color content or a luminance component. Further, step 1004 may be performed by processing unit 120 in FIG. 1. The monochrome color content or the luminance component may correspond to a luminance plane, such that the rendered content associated with the data for each of the plurality of frames may correspond to the luminance plane. The rendered content associated with the data for each of the plurality of frames may include the luminance component, and the rendered content may not include a chrominance component. Also, the rendered content associated with the data for each of the plurality of frames may include the monochrome color content, and the rendered content may not include color content other than the monochrome color content.

At 1006, the server may encode the rendered content associated with the data for each of the plurality of frames, where the rendered content is encoded prior to being converted, the encoded content including at least one of the monochrome color content or the luminance component, as described in connection with the examples in FIGS. 1-6. For example, as described in 622 of FIG. 6, server 602 may encode the rendered content associated with the data for each of the plurality of frames, where the rendered content is encoded prior to being converted, the encoded content including at least one of the monochrome color content or the luminance component. Further, step 1006 may be performed by processing unit 120 in FIG. 1.

At 1008, the server may encrypt the encoded content associated with the data for each of the plurality of frames, where the encoded content is encrypted prior to being converted, the encrypted content including at least one of the monochrome color content or the luminance component, as described in connection with the examples in FIGS. 1-6. For example, as described in 624 of FIG. 6, server 602 may encrypt the encoded content associated with the data for each of the plurality of frames, where the encoded content is encrypted prior to being converted, the encrypted content including at least one of the monochrome color content or the luminance component. Further, step 1008 may be performed by processing unit 120 in FIG. 1.

At 1010, the server may convert the rendered content associated with the data for each of the plurality of frames to a plurality of data packets, as described in connection with the examples in FIGS. 1-6. For example, as described in 630 of FIG. 6, server 602 may convert the rendered content associated with the data for each of the plurality of frames to a plurality of data packets. Further, step 1010 may be performed by processing unit 120 in FIG. 1. In some instances, converting the rendered content to the plurality of data packets may include: packetizing the rendered content into the plurality of data packets.

At 1012, the server may transmit, to a client device, the plurality of data packets corresponding to the rendered content associated with the data for each of the plurality of frames, as described in connection with the examples in FIGS. 1-6. For example, as described in 640 of FIG. 6, server 602 may transmit, to a client device, the plurality of data packets corresponding to the rendered content associated with the data for each of the plurality of frames. Further, step 1012 may be performed by processing unit 120 in FIG. 1.

In configurations, a method or an apparatus for graphics processing is provided. The apparatus may be server or a client device, which may be associated with a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for receiving, from a server, a plurality of data packets corresponding to data for each of a plurality of frames associated with at least one application, the data for each of the plurality of frames being monochrome color data or polychrome color data; means for converting the plurality of data packets to content associated with the data for each of the plurality of frames, the content including at least one of monochrome color content or a luminance component; means for performing a color space conversion on the content associated with the data for each of the plurality of frames, the color space conversion adding at least one chrominance plane to the content; means for displaying, upon performing the color space conversion, the content associated with the data for each of the plurality of frames; means for decrypting the content associated with the data for each of the plurality of frames, where the content is decrypted prior to the color space conversion, the decrypted content including at least one of the monochrome color content or the luminance component; means for decoding the decrypted content associated with the data for each of the plurality of frames, where the content is decoded prior to the color space conversion, the decoded content including at least one of the monochrome color content or the luminance component; means for receiving data for each of a plurality of frames associated with at least one application, the data for each of the plurality of frames being monochrome color data or polychrome color data; means for rendering content associated with the data for each of the plurality of frames, the rendered content including at least one of monochrome color content or a luminance component; means for converting the rendered content associated with the data for each of the plurality of frames to a plurality of data packets; means for transmitting, to a client device, the plurality of data packets corresponding to the rendered content associated with the data for each of the plurality of frames; means for encoding the rendered content associated with the data for each of the plurality of frames, where the rendered content is encoded prior to being converted, the encoded content including at least one of the monochrome color content or the luminance component; and means for encrypting the encoded content associated with the data for each of the plurality of frames, where the encoded content is encrypted prior to being converted, the encrypted content including at least one of the monochrome color content or the luminance component.

The subject matter described herein may be implemented to realize one or more benefits or advantages. For instance, the described graphics processing techniques may be used by a server, a client device, a GPU, a graphics processor, or some other processor that may perform graphics processing to implement the chrominance optimization techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize chrominance optimization techniques in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing at a client device including at least one processor coupled to a memory and configured to: receive, from a server, a plurality of data packets corresponding to data for each of a plurality of frames associated with at least one application, the data for each of the plurality of frames being monochrome color data or polychrome color data; convert the plurality of data packets to content associated with the data for each of the plurality of frames, the content including at least one of monochrome color content or a luminance component; perform a color space conversion on the content associated with the data for each of the plurality of frames, the color space conversion adding at least one chrominance plane to the content; and display, upon performing the color space conversion, the content associated with the data for each of the plurality of frames.

Aspect 2 is the apparatus of aspect 1, where the at least one processor is further configured to: decrypt the content associated with the data for each of the plurality of frames, where the content is decrypted prior to the color space conversion, the decrypted content including at least one of the monochrome color content or the luminance component.

Aspect 3 is the apparatus of any of aspects 1 and 2, where the at least one processor is further configured to: decode the decrypted content associated with the data for each of the plurality of frames, where the content is decoded prior to the color space conversion, the decoded content including at least one of the monochrome color content or the luminance component.

Aspect 4 is the apparatus of any of aspects 1 to 3, where the monochrome color content or the luminance component corresponds to a luminance plane, such that after the color space conversion the content associated with the data for each of the plurality of frames includes the luminance plane and the at least one chrominance plane.

Aspect 5 is the apparatus of any of aspects 1 to 4, where, prior to the color space conversion, the content associated with the data for each of the plurality of frames includes the luminance component, such that the content does not include a chrominance component prior to the color space conversion.

Aspect 6 is the apparatus of any of aspects 1 to 5, where, prior to the color space conversion, the content associated with the data for each of the plurality of frames includes the monochrome color content, such that the content does not include color content other than the monochrome color content prior to the color space conversion.

Aspect 7 is the apparatus of any of aspects 1 to 6, where to convert the plurality of data packets to the content, the at least one processor is configured to: de-packetize the plurality of data packets into the content.

Aspect 8 is the apparatus of any of aspects 1 to 7, where the at least one chrominance plane is at least one dummy chrominance plane, at least one placeholder chrominance plane, at least one stand-in chrominance plane, at least one artificial chrominance plane, or at least one fake chrominance plane.

Aspect 9 is the apparatus of any of aspects 1 to 8, where the at least one chrominance plane is prepared at an initialization time period, and the at least one chrominance plane is associated with static color-filled data.

Aspect 10 is the apparatus of any of aspects 1 to 9, where the at least one chrominance plane is prepared using one or more artificial colors based on luminance content or a user configuration via machine learning (ML), deep learning, a hardware mechanism, at least one neural network (NN), or at least one open criteria.

Aspect 11 is the apparatus of any of aspects 1 to 10, where the color space conversion is a luminance (Y) chrominance (UV) (YUV) color conversion, a red (R) green (G) blue (B) (RGB) color conversion, or a luminance (Y) chrominance (CrCb) (YCrCb) color conversion.

Aspect 12 is the apparatus of any of aspects 1 to 11, where the at least one application is associated with color generation of the plurality of frames, and hardware or software associated with the at least one application generates luminance color data, where the at least one application is at least one game, at least one video, at least one symbol, at least one icon, or displayed content.

Aspect 13 is the apparatus of any of aspects 1 to 12, where the data for each of the plurality of frames corresponds to luminance (Y) chrominance (UV) (YUV) color data, red (R) green (G) blue (B) (RGB) color data, or luminance (Y) chrominance (CrCb) (YCrCb) color data.

Aspect 14 is the apparatus of any of aspects 1 to 13, where the data for each of the plurality of frames is associated with a plurality of input channels or a plurality of input planes, and the plurality of input planes includes a luminance plane (Y) and one or more chrominance planes (UV), where the polychrome color data for each of the plurality of frames includes full color data or partial color data.

Aspect 15 is the apparatus of any of aspects 1 to 14, where the reception of the plurality of data packets corresponds to at least one of: a wireless transmission, a wired transmission, or a peripheral component interconnect express (PCIE) process.

Aspect 16 is the apparatus of any of aspects 1 to 15, where the server is at least one of: a phone, a smart phone, a computer, or a cloud server, and where the client device is at least one of: a headset, a head mounted display (HMD), display glasses, or smart glasses.

Aspect 17 is the apparatus of any of aspects 1 to 16, further including at least one of an antenna or a transceiver coupled to the at least one processor.

Aspect 18 is a method of graphics processing for implementing any of aspects 1 to 17.

Aspect 19 is an apparatus for graphics processing including means for implementing any of aspects 1 to 17.

Aspect 20 is a computer-readable medium storing computer executable code, the code when executed by at least one processor causes the at least one processor to implement any of aspects 1 to 17.

Aspect 21 is an apparatus for graphics processing at a server including at least one processor coupled to a memory and configured to: receive data for each of a plurality of frames associated with at least one application, the data for each of the plurality of frames being monochrome color data or polychrome color data; render content associated with the data for each of the plurality of frames, the rendered content including at least one of monochrome color content or a luminance component; convert the rendered content associated with the data for each of the plurality of frames to a plurality of data packets; and transmit, to a client device, the plurality of data packets corresponding to the rendered content associated with the data for each of the plurality of frames.

Aspect 22 is the apparatus of aspect 21, where the at least one processor is further configured to: encode the rendered content associated with the data for each of the plurality of frames, where the rendered content is encoded prior to being converted, the encoded content including at least one of the monochrome color content or the luminance component.

Aspect 23 is the apparatus of any of aspects 21 and 22, where the at least one processor is further configured to: encrypt the encoded content associated with the data for each of the plurality of frames, where the encoded content is encrypted prior to being converted, the encrypted content including at least one of the monochrome color content or the luminance component.

Aspect 24 is the apparatus of any of aspects 21 to 23, where the monochrome color content or the luminance component corresponds to a luminance plane, such that the rendered content associated with the data for each of the plurality of frames corresponds to the luminance plane.

Aspect 25 is the apparatus of any of aspects 21 to 24, where the rendered content associated with the data for each of the plurality of frames includes the luminance component, and the rendered content does not include a chrominance component.

Aspect 26 is the apparatus of any of aspects 21 to 25, where the rendered content associated with the data for each of the plurality of frames includes the monochrome color content, and the rendered content does not include color content other than the monochrome color content.

Aspect 27 is the apparatus of any of aspects 21 to 26, where to convert the rendered content to the plurality of data packets, the at least one processor is configured to: packetize the rendered content into the plurality of data packets.

Aspect 28 is the apparatus of any of aspects 21 to 27, where the at least one application is associated with color generation of the plurality of frames, and hardware or software associated with the at least one application generates luminance color data, where the at least one application is at least one game, at least one video, at least one symbol, at least one icon, or displayed content.

Aspect 29 is the apparatus of any of aspects 21 to 28, where the data for each of the plurality of frames corresponds to luminance (Y) chrominance (UV) (YUV) color data, red (R) green (G) blue (B) (RGB) color data, or luminance (Y) chrominance (CrCb) (YCrCb) color data.

Aspect 30 is the apparatus of any of aspects 21 to 29, where the data for each of the plurality of frames is associated with a plurality of input channels or a plurality of input planes, and the plurality of input planes includes a luminance plane (Y) and one or more chrominance planes (UV), where the polychrome color data for each of the plurality of frames includes full color data or partial color data, and the polychrome color data is not generated or decoded by the at least one application once the data for each of the plurality of frames is received.

Aspect 31 is the apparatus of any of aspects 21 to 30, where the transmission of the plurality of data packets corresponds to at least one of: a wireless transmission, a wired transmission, or a peripheral component interconnect express (PCIE) process.

Aspect 32 is the apparatus of any of aspects 21 to 31, where the server is at least one of: a phone, a smart phone, a computer, or a cloud server, and where the client device is at least one of: a headset, a head mounted display (HMD), display glasses, or smart glasses.

Aspect 33 is the apparatus of any of aspects 21 to 32, further including at least one of an antenna or a transceiver coupled to the at least one processor.

Aspect 34 is a method of graphics processing for implementing any of aspects 21 to 33.

Aspect 35 is an apparatus for graphics processing including means for implementing any of aspects 21 to 33.

Aspect 36 is a computer-readable medium storing computer executable code, the code when executed by at least one processor causes the at least one processor to implement any of aspects 21 to 33.

What is claimed is:

1. An apparatus for graphics processing at a client device, comprising:
   a memory; and
   at least one processor coupled to the memory and configured to:
   receive, from a server, a plurality of data packets corresponding to data for each of a plurality of frames associated with at least one application, the data for each of the plurality of frames being monochrome color data or polychrome color data;
   convert the plurality of data packets to content associated with the data for each of the plurality of frames, the content including at least one of monochrome color content or a luminance component;
   perform a color space conversion on the content associated with the data for each of the plurality of frames, the color space conversion adding at least one chrominance plane to the content; and
   display, upon performing the color space conversion, the content associated with the data for each of the plurality of frames,
   wherein the at least one chrominance plane is at least one dummy chrominance plane, at least one placeholder chrominance plane, at least one stand-in chrominance plane, at least one artificial chrominance plane, or at least one fake chrominance plane.

2. The apparatus of claim 1, wherein the at least one processor is further configured to:
   decrypt the content associated with the data for each of the plurality of frames, wherein the content is decrypted prior to the color space conversion, the decrypted content including at least one of the monochrome color content or the luminance component.

3. The apparatus of claim 2, wherein the at least one processor is further configured to:
   decode the decrypted content associated with the data for each of the plurality of frames, wherein the content is decoded prior to the color space conversion, the decoded content including at least one of the monochrome color content or the luminance component.

4. The apparatus of claim 1, wherein the monochrome color content or the luminance component corresponds to a luminance plane, such that after the color space conversion the content associated with the data for each of the plurality of frames includes the luminance plane and the at least one chrominance plane.

5. The apparatus of claim 1, wherein, prior to the color space conversion, the content associated with the data for each of the plurality of frames includes the luminance component, such that the content does not include a chrominance component prior to the color space conversion.

6. The apparatus of claim 1, wherein, prior to the color space conversion, the content associated with the data for each of the plurality of frames includes the monochrome color content, such that the content does not include color content other than the monochrome color content prior to the color space conversion.

7. The apparatus of claim 1, wherein to convert the plurality of data packets to the content, the at least one processor is configured to: de-packetize the plurality of data packets into the content.

8. The apparatus of claim 1, wherein the at least one chrominance plane is prepared at an initialization time period, and the at least one chrominance plane is associated with static color-filled data.

9. The apparatus of claim 1, wherein the at least one chrominance plane is prepared using one or more artificial colors based on luminance content or a user configuration via machine learning (ML), deep learning, a hardware mechanism, at least one neural network (NN), or at least one open criteria.

10. The apparatus of claim 1, wherein the color space conversion is a luminance (Y) chrominance (UV) (YUV)

color conversion, a red (R) green (G) blue (B) (RGB) color conversion, or a luminance (Y) chrominance (CrCb) (YCrCb) color conversion.

11. The apparatus of claim 1, wherein the at least one application is associated with color generation of the plurality of frames, and hardware or software associated with the at least one application generates luminance color data, wherein the at least one application is at least one game, at least one video, at least one symbol, at least one icon, or displayed content.

12. The apparatus of claim 1, wherein the data for each of the plurality of frames corresponds to luminance (Y) chrominance (UV) (YUV) color data, red (R) green (G) blue (B) (RGB) color data, or luminance (Y) chrominance (CrCb) (YCrCb) color data.

13. The apparatus of claim 1, wherein the data for each of the plurality of frames is associated with a plurality of input channels or a plurality of input planes, and the plurality of input planes includes a luminance plane (Y) and one or more chrominance planes (UV),
wherein the polychrome color data for each of the plurality of frames includes full color data or partial color data.

14. The apparatus of claim 1, wherein the reception of the plurality of data packets corresponds to at least one of: a wireless transmission, a wired transmission, or a peripheral component interconnect express (PCIE) process.

15. The apparatus of claim 1, further comprising at least one of an antenna or a transceiver coupled to the at least one processor, wherein the server is at least one of: a phone, a smart phone, a computer, or a cloud server, and wherein the client device is at least one of: a headset, a head mounted display (HMD), display glasses, or smart glasses.

16. An apparatus for graphics processing at a server, comprising:
a memory; and
at least one processor coupled to the memory and configured to:
receive data for each of a plurality of frames associated with at least one application, the data for each of the plurality of frames being monochrome color data or polychrome color data;
render content associated with the data for each of the plurality of frames, the rendered content including at least one of monochrome color content or a luminance component;
convert the rendered content associated with the data for each of the plurality of frames to a plurality of data packets; and
transmit, to a client device, the plurality of data packets corresponding to the rendered content associated with the data for each of the plurality of frames,
wherein the data for each of the plurality of frames is associated with a plurality of input channels or a plurality of input planes, and the plurality of input planes includes a luminance plane (Y) and one or more chrominance planes (UV), and
wherein the at least one chrominance plane is at least one dummy chrominance plane, at least one placeholder chrominance plane, at least one stand-in chrominance plane, at least one artificial chrominance plane, or at least one fake chrominance plane.

17. The apparatus of claim 16, wherein the at least one processor is further configured to:
encode the rendered content associated with the data for each of the plurality of frames, wherein the rendered content is encoded prior to being converted, the encoded content including at least one of the monochrome color content or the luminance component.

18. The apparatus of claim 17, wherein the at least one processor is further configured to:
encrypt the encoded content associated with the data for each of the plurality of frames, wherein the encoded content is encrypted prior to being converted, the encrypted content including at least one of the monochrome color content or the luminance component.

19. The apparatus of claim 16, wherein the monochrome color content or the luminance component corresponds to a luminance plane, such that the rendered content associated with the data for each of the plurality of frames corresponds to the luminance plane.

20. The apparatus of claim 16, wherein the rendered content associated with the data for each of the plurality of frames includes the luminance component, and the rendered content does not include a chrominance component.

21. The apparatus of claim 16, wherein the rendered content associated with the data for each of the plurality of frames includes the monochrome color content, and the rendered content does not include color content other than the monochrome color content.

22. The apparatus of claim 16, wherein to convert the rendered content to the plurality of data packets, the at least one processor is configured to: packetize the rendered content into the plurality of data packets.

23. The apparatus of claim 16, wherein the at least one application is associated with color generation of the plurality of frames, and hardware or software associated with the at least one application generates luminance color data, wherein the at least one application is at least one game, at least one video, at least one symbol, at least one icon, or displayed content.

24. The apparatus of claim 16, wherein the data for each of the plurality of frames corresponds to luminance (Y) chrominance (UV) (YUV) color data, red (R) green (G) blue (B) (RGB) color data, or luminance (Y) chrominance (CrCb) (YCrCb) color data.

25. The apparatus of claim 16,
wherein the polychrome color data for each of the plurality of frames includes full color data or partial color data, and the polychrome color data is not generated or decoded by the at least one application once the data for each of the plurality of frames is received.

26. The apparatus of claim 16, wherein the transmission of the plurality of data packets corresponds to at least one of: a wireless transmission, a wired transmission, or a peripheral component interconnect express (PCIE) process.

27. The apparatus of claim 16, further comprising at least one of an antenna or a transceiver coupled to the at least one processor, wherein the server is at least one of: a phone, a smart phone, a computer, or a cloud server, and wherein the client device is at least one of: a headset, a head mounted display (HMD), display glasses, or smart glasses.

28. A method of graphics processing at a client device, comprising:
receiving, from a server, a plurality of data packets corresponding to data for each of a plurality of frames associated with at least one application, the data for each of the plurality of frames being monochrome color data or polychrome color data;
converting the plurality of data packets to content associated with the data for each of the plurality of frames, the content including at least one of monochrome color content or a luminance component;

performing a color space conversion on the content associated with the data for each of the plurality of frames, the color space conversion adding at least one chrominance plane to the content; and displaying, upon performing the color space conversion, the content associated with the data for each of the plurality of frames, wherein the at least one chrominance plane is at least one dummy chrominance plane, at least one placeholder chrominance plane, at least one stand-in chrominance plane, at least one artificial chrominance plane, or at least one fake chrominance plane.

29. A method of graphics processing at a server, comprising:

receiving data for each of a plurality of frames associated with at least one application, the data for each of the plurality of frames being monochrome color data or polychrome color data;

rendering content associated with the data for each of the plurality of frames, the rendered content including at least one of monochrome color content or a luminance component;

converting the rendered content associated with the data for each of the plurality of frames to a plurality of data packets; and transmitting, to a client device, the plurality of data packets corresponding to the rendered content associated with the data for each of the plurality of frames, wherein the data for each of the plurality of frames is associated with a plurality of input channels or a plurality of input planes, and the plurality of input planes includes a luminance plane (Y) and one or more chrominance planes (UV), and wherein the at least one chrominance plane is at least one dummy chrominance plane, at least one placeholder chrominance plane, at least one stand-in chrominance plane, at least one artificial chrominance plane, or at least one fake chrominance plane.

* * * * *